(12) United States Patent
Hodgins et al.

(10) Patent No.: US 12,647,479 B2
(45) Date of Patent: Jun. 2, 2026

(54) DYNAMICALLY GENERATED CONTEXT PANE WITHIN A GROUP-BASED COMMUNICATION INTERFACE

(71) Applicant: Salesforce, Inc., San Francisco, CA (US)

(72) Inventors: Matthew Hodgins, Toronto (CA);
Sarah Raines, Philadelphia, PA (US);
Christine Lee, Oakland, CA (US);
Shanan Delp, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 18/453,781

(22) Filed: Aug. 22, 2023

(65) Prior Publication Data

US 2024/0089318 A1 Mar. 14, 2024

Related U.S. Application Data

(63) Continuation of application No. 16/990,621, filed on Aug. 11, 2020, now Pat. No. 11,778,022.
(Continued)

(51) Int. Cl.
*G06F 15/16* (2006.01)
*G06F 40/166* (2020.01)
(Continued)

(52) U.S. Cl.
CPC ........ *H04L 67/1044* (2013.01); *G06F 40/166* (2020.01); *H04L 67/306* (2013.01); *H04W 4/08* (2013.01); *G06N 20/00* (2019.01)

(58) Field of Classification Search
CPC . H04L 67/1044; H04L 67/306; G06F 40/166; H04W 4/08; G06N 20/00
(Continued)

(56) References Cited

U.S. PATENT DOCUMENTS 8,462,368 B2 * 6/2013 Osadchyy ............... H04L 41/22
709/219
8,797,999 B2 8/2014 Pance et al.
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Thuong Nguyen
(74) *Attorney, Agent, or Firm* — Lee & Hayes, P.C.

(57) ABSTRACT

Various examples of the present disclosure can be directed to programmatically generating and rendering for display a context pane within a group-based communication interface. In some examples, the context pane comprises context pane content representative of channel membership associated with a communication channel identifier with which the group-based communication interface is associated. Group-based communication objects of a group-based communication data corpus can be utilized (e.g., by way of a trained machine learning model and/or work graph data structures) to inform the determination of context pane content.

20 Claims, 26 Drawing Sheets

Related U.S. Application Data

(60) Provisional application No. 62/886,877, filed on Aug. 14, 2019.

(51) Int. Cl.
  *H04L 67/104*     (2022.01)
  *H04L 67/306*     (2022.01)
  *H04W 4/08*     (2009.01)
  *G06N 20/00*     (2019.01)

(58) Field of Classification Search
  USPC ......................................................... 709/204
  See application file for complete search history.

(56)                References Cited

U.S. PATENT DOCUMENTS

| | | | | |
|---|---|---|---|---|
| 10,949,619 | B1* | 3/2021 | Arsanjani | H04L 67/535 |
| 11,778,022 | B2* | 10/2023 | Hodgins | G06F 40/166 |
| | | | | 709/204 |
| 11,916,862 | B1* | 2/2024 | Li | H04L 51/52 |
| 2003/0028624 | A1* | 2/2003 | Hasan | H04L 41/0213 |
| | | | | 715/734 |
| 2004/0268260 | A1 | 12/2004 | Rockey et al. | |
| 2006/0170945 | A1 | 8/2006 | Bill | |
| 2006/0203770 | A1 | 9/2006 | Kjellberg | |
| 2006/0253411 | A1 | 11/2006 | Roy-Chowdhury et al. | |
| 2007/0037599 | A1* | 2/2007 | Tillet | H04L 12/1813 |
| | | | | 455/521 |
| 2008/0039012 | A1 | 2/2008 | McKay et al. | |
| 2008/0052374 | A1* | 2/2008 | Powers | H04M 3/5183 |
| | | | | 709/217 |
| 2008/0209061 | A1 | 8/2008 | Shenfield | |
| 2009/0100358 | A1 | 4/2009 | Lauridsen et al. | |
| 2009/0144237 | A1 | 6/2009 | Branam | |
| 2009/0193016 | A1 | 7/2009 | Jones | |
| 2009/0198816 | A1 | 8/2009 | Bannister et al. | |
| 2009/0222763 | A1* | 9/2009 | Dukhon | G06F 3/04845 |
| | | | | 715/808 |
| 2009/0249223 | A1* | 10/2009 | Barsook | H04N 7/15 |
| | | | | 715/753 |
| 2010/0138491 | A1 | 6/2010 | Churchill et al. | |
| 2010/0162365 | A1 | 6/2010 | Del Real | |
| 2011/0010209 | A1* | 1/2011 | McNally | G06N 20/00 |
| | | | | 706/47 |
| 2011/0010644 | A1 | 1/2011 | Merrill et al. | |
| 2011/0090056 | A1 | 4/2011 | Kawasaki et al. | |
| 2011/0289139 | A1* | 11/2011 | McIntosh | H04L 65/60 |
| | | | | 709/203 |
| 2012/0150960 | A1* | 6/2012 | Nalawade | G06Q 50/01 |
| | | | | 709/204 |
| 2012/0290715 | A1* | 11/2012 | Dinger | H04L 12/6418 |
| | | | | 709/224 |
| 2013/0007137 | A1* | 1/2013 | Azzam | H04L 51/216 |
| | | | | 709/206 |
| 2013/0176895 | A1* | 7/2013 | McEachern | H04L 12/185 |
| | | | | 370/254 |
| 2013/0179494 | A1* | 7/2013 | Chakravarthy | H04N 21/4886 |
| | | | | 709/203 |
| 2014/0082497 | A1 | 3/2014 | Chalouhi et al. | |
| 2014/0189011 | A1 | 7/2014 | Whitley | |
| 2014/0207874 | A1 | 7/2014 | Soorianarayanan et al. | |
| 2014/0245183 | A1 | 8/2014 | Lewis et al. | |
| 2014/0280377 | A1 | 9/2014 | Frew | |
| 2015/0149544 | A1 | 5/2015 | Zhang | |
| 2015/0234787 | A1 | 8/2015 | Itamoto | |
| 2016/0019397 | A1* | 1/2016 | Peterson | G06F 16/955 |
| | | | | 726/28 |
| 2016/0117520 | A1 | 4/2016 | Safa | |
| 2016/0149850 | A1* | 5/2016 | Pan | H04L 67/535 |
| | | | | 709/206 |
| 2016/0286526 | A1* | 9/2016 | Shirazi | H04W 4/12 |
| 2016/0380952 | A1* | 12/2016 | Vora | H04L 51/52 |
| | | | | 709/206 |
| 2017/0080288 | A1* | 3/2017 | Roh | A61B 5/6898 |
| 2017/0118599 | A1* | 4/2017 | Cabral | H04W 4/44 |
| 2017/0139918 | A1* | 5/2017 | Mulukuri | G06F 16/24578 |
| 2017/0289235 | A1* | 10/2017 | Mattox, Jr. | G06F 3/0482 |
| 2018/0197144 | A1 | 7/2018 | Frank et al. | |
| 2018/0212903 | A1* | 7/2018 | Rose | H04L 12/1822 |
| 2018/0247054 | A1 | 8/2018 | Porat et al. | |
| 2018/0287982 | A1 | 10/2018 | Draeger et al. | |
| 2018/0332008 | A1 | 11/2018 | Norman et al. | |
| 2019/0065976 | A1 | 2/2019 | Murray et al. | |
| 2019/0171664 | A1* | 6/2019 | Musallam | G06T 13/80 |
| 2019/0266528 | A1* | 8/2019 | Cheng | G06T 11/206 |
| 2019/0286943 | A1 | 9/2019 | Leskovec et al. | |
| 2019/0294641 | A1* | 9/2019 | Alexeev | G06F 16/958 |
| 2019/0370754 | A1* | 12/2019 | Berget | G06F 16/24578 |
| 2020/0209855 | A1* | 7/2020 | Shen | B60R 16/0231 |
| 2020/0250180 | A1* | 8/2020 | Mathew | G06F 21/604 |
| 2021/0051196 | A1* | 2/2021 | Hodgins | H04L 67/1044 |
| 2024/0089318 | A1* | 3/2024 | Hodgins | H04W 4/08 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Office Action for U.S. Appl. No. 16/990,621, mailed on Jan. 6, 2023, Hodgins, "Dynamically Generated Context Pane Within a Group-Based Communication Interface", 18 pages.

Office Action for U.S. Appl. No. 16/990,621, mailed on Oct. 5, 2021, Hodgins, "Dynamically Generated Context Pane Within a Group-Based Communication Interface", 16 pages.

Office Action for U.S. Appl. No. 16/990,621, mailed on Apr. 7, 2022, Hodgins, "Dynamically Generated Context Pane Within a Group-Based Communication Interface", 16 Pages.

Office Action for U.S. Appl. No. 16/990,621, mailed on May 13, 2021, Hodgins, "Dynamically Generated Context Pane Within a Group-Based Communication Interface", 15 pages.

Office Action for U.S. Appl. No. 16/990,621, mailed Aug. 3, 2022, Hodgins, "Dynamically Generated Context Pane Within a Group-Based Communication Interface", 17 pages.

(56)     References Cited

OTHER PUBLICATIONS

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

100

200

300

303

304

305

306

307

308

309

310

311

312

317

318

319

319

323

324

323

324

335

335

341

342

343

344

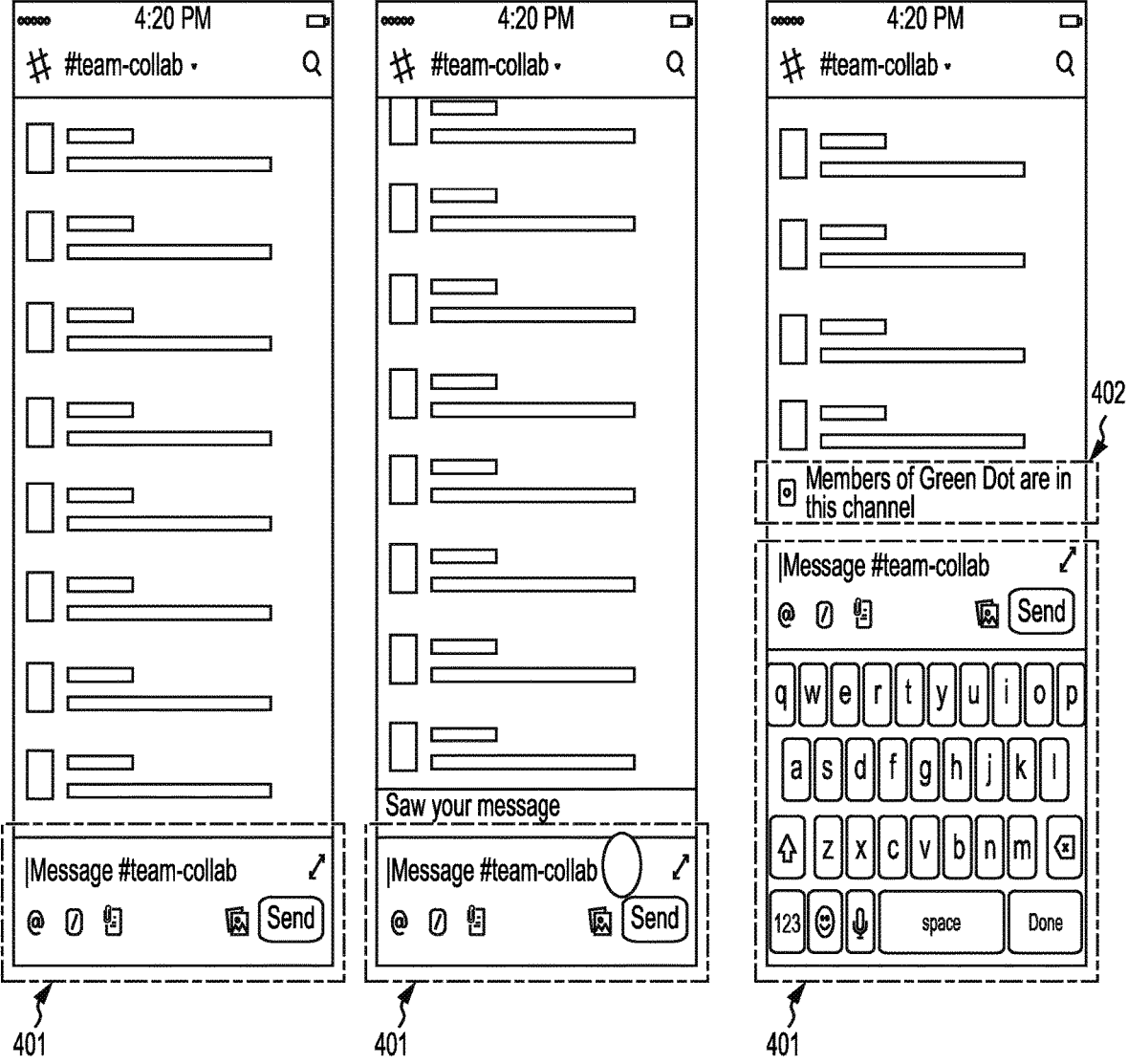
FIG. 4A      FIG. 4B      FIG. 4C

501

502

502

Focused                    Unfocused

602

601

602

Focused                    Typing

1000

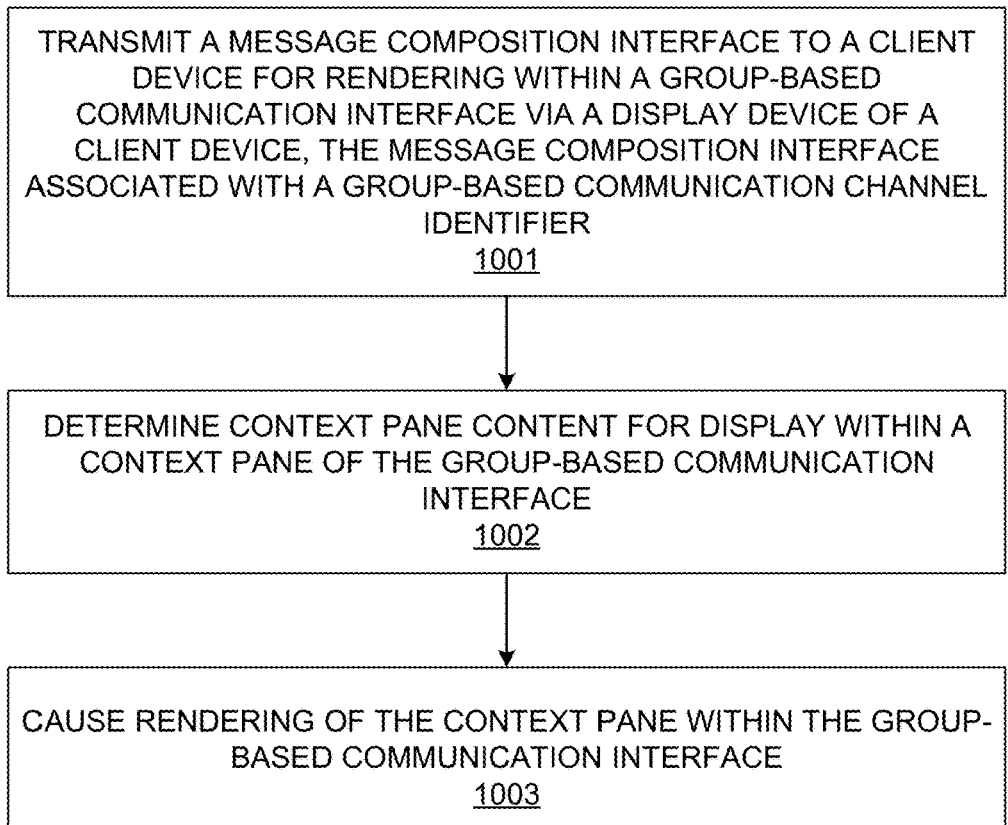

TRANSMIT A MESSAGE COMPOSITION INTERFACE TO A CLIENT DEVICE FOR RENDERING WITHIN A GROUP-BASED COMMUNICATION INTERFACE VIA A DISPLAY DEVICE OF A CLIENT DEVICE, THE MESSAGE COMPOSITION INTERFACE ASSOCIATED WITH A GROUP-BASED COMMUNICATION CHANNEL IDENTIFIER
1001

DETERMINE CONTEXT PANE CONTENT FOR DISPLAY WITHIN A CONTEXT PANE OF THE GROUP-BASED COMMUNICATION INTERFACE
1002

CAUSE RENDERING OF THE CONTEXT PANE WITHIN THE GROUP-BASED COMMUNICATION INTERFACE
1003

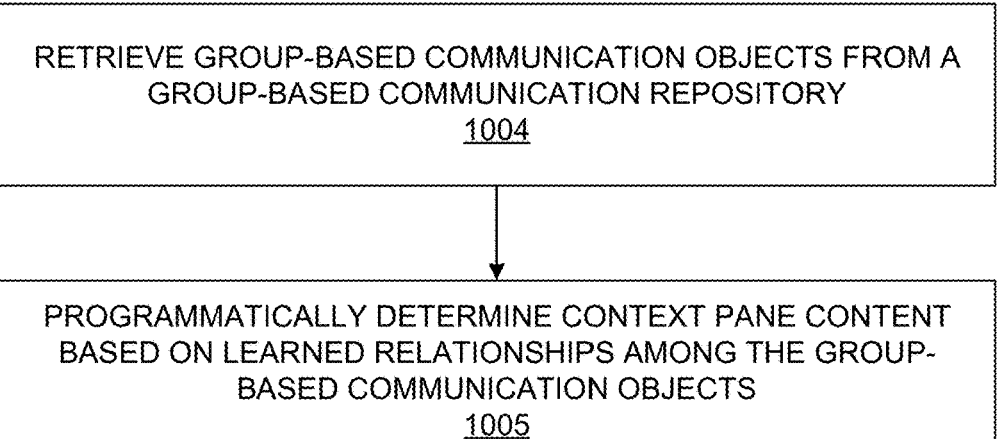

RETRIEVE GROUP-BASED COMMUNICATION OBJECTS FROM A GROUP-BASED COMMUNICATION REPOSITORY
1004

PROGRAMMATICALLY DETERMINE CONTEXT PANE CONTENT BASED ON LEARNED RELATIONSHIPS AMONG THE GROUP-BASED COMMUNICATION OBJECTS
1005

FIG. 10A

DYNAMICALLY GENERATED CONTEXT PANE WITHIN A GROUP-BASED COMMUNICATION INTERFACE

PRIORITY

This application is a continuation of and claims priority to U.S. patent application Ser. No. 16/990,621, filed on Aug. 11, 2020, which claims priority to U.S. Provisional Patent Application No. 62/886,877, filed on Aug. 14, 2019, the entire contents of which are incorporated by reference herein.

TECHNICAL FIELD

A communication platform can leverage a network-based computing system to enable users to exchange data. In an example, users of the communication platform can communicate with other users via communication channels (or "channels"). A communication channel, or other virtual space, can be a data route used for exchanging data between and among systems and devices associated with the communication platform. For example, a communication channel may be established between and among various user computing devices, allowing the user computing devices to communicate and share data between and among each other over one or more networks. That is, in some examples, the communication platform can be a channel-based messaging platform and/or hub for facilitating communication between and among users. In some examples, data associated with a communication channel can be presented via a user interface. In some examples, the user interface can present a data feed indicating messages posted to and/or actions taken with respect to a particular communication channel.

Systems have been provided for facilitating messaging communications among a plurality of users across client devices connected with such communication platforms. There can be a number of deficiencies and problems associated with conventional communication platforms. Through applied effort, ingenuity, and innovation, these deficiencies and problems have been mitigated by developing solutions that can be structured in accordance with the some examples of the present invention, many examples of which can be described in detail herein.

BRIEF SUMMARY

Various some examples of the present disclosure can be directed to programmatically generating and rendering for display a context pane within a user interface associated with a communication platform. In some examples, the context pane can include context pane content representative of channel membership associated with a communication channel of a communication platform with which the user interface is associated. Group-based communication objects of a group-based communication data corpus can be utilized (e.g., by way of a trained machine learning model and/or work graph data structures) to inform the determination of context pane content.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures can be not drawn to scale.

FIGS. 4A-4C illustrate example group-based communication interfaces configured in accordance with some examples of the present disclosure;

FIG. 10A is a flowchart illustrating example steps for determining and rendering context pane content within a context pane for use with some examples of the present disclosure.

Figure 1:
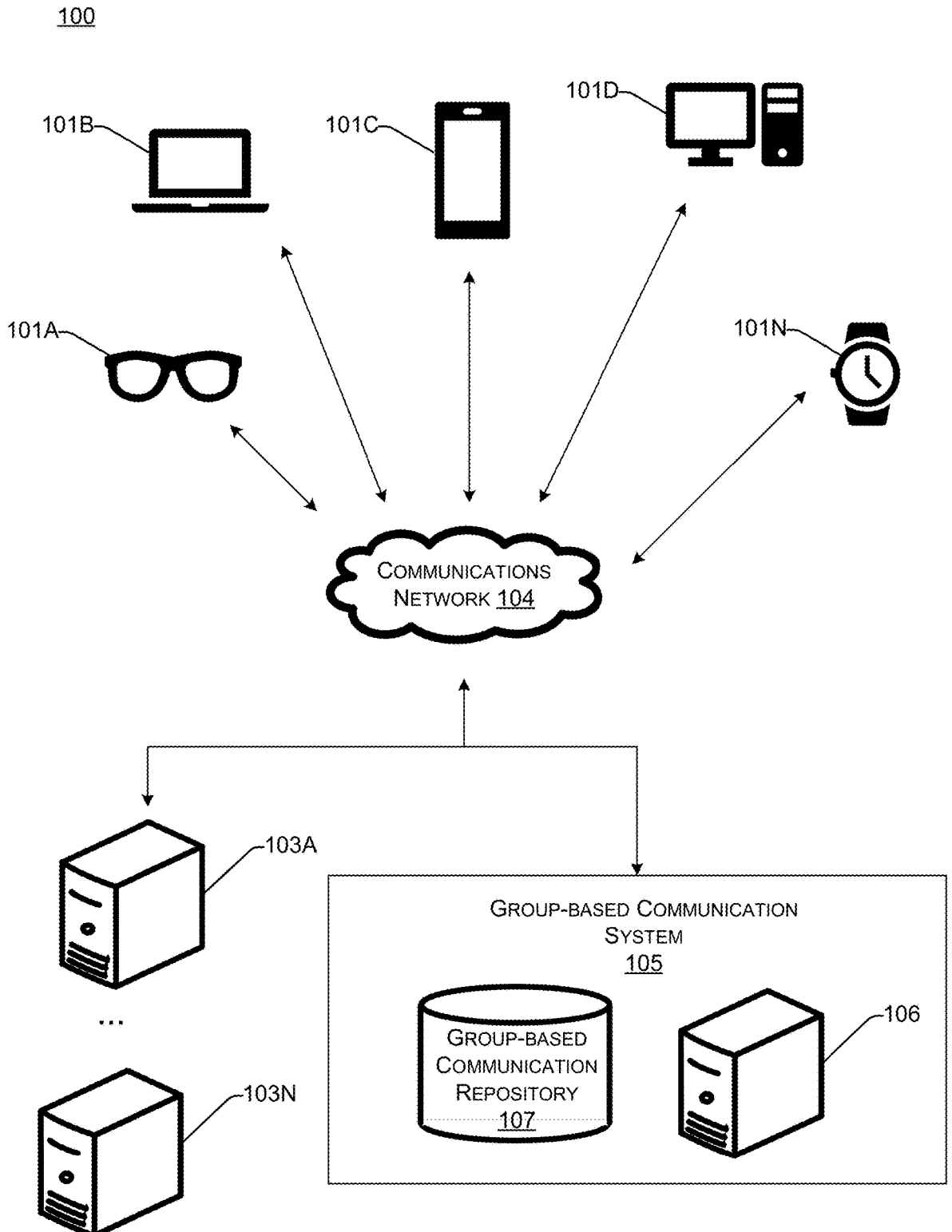
FIG. 1 illustrates a schematic of an example communication platform in accordance with some examples of the present disclosure.

Below, the detailed description more fully describes various some examples with reference to the accompanying drawings. It should be understood that some, but not all some examples can be shown and described herein. Indeed, some examples may take many different forms, and accordingly this disclosure should not be construed as limited to the some examples set forth herein. Rather, these some examples can be provided so that this disclosure will satisfy applicable legal requirements.

DETAILED DESCRIPTION

Generating context panes in user interfaces associated with a communication platform is described. In some examples, a context pane, which can be a bar or other user interface element associated with an input mechanism of a message composition interface, can be generated dynamically based at least in part on data associated with a communication channel and/or members associated with such a communication channel. Content presented via the context pane can include indications of whether the communication channel is shared externally, other organization(s) with whom the communication channel is externally shared, indications of guest(s) associated with the communication channel, and/or the like. In some examples, the content presented via the context pane can indicate member(s) associated with the communication channel, time zone information associated with member(s), custom status information associated with the members(s), and/or the like. In some examples, the content presented via the context pane can indicate one or more suggested topics to include in the context pane content. In at least one example, the content presented via the context pane can indicate one or more suggested user identifiers for mentioning in the message composition interface, one or more pending invites associated with the communication channel, and/or the like. Such content can be presented such to alert or otherwise bring awareness to a user in association with an interaction with a message composition interface. Such context panes can therefore provide more security and a better user experience for users of a communication platform than existing or conventional technology.

In at least one example, the communication platform can be a group-based communication system, a channel-based messaging system and/or any other system or platform for facilitating communication. In at least one example, the term "group-based" can be used herein to refer to a system, channel, communication, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) can be used to associate data, information, messages, users, communication channels, etc., with specific groups of a group-based communication system as defined below.

For the purpose of this discussion, the term "group-based communication system" can refer to a communications software platform and associated hardware that is configured to support and maintain a plurality of group-based communication workspaces and all associated functionality. Group-based communication system users can be organized into organization groups (e.g., employees of different companies may be separate organization groups) and each group can interact with the group-based communication system via a respective group-based communication workspace. For example, the group-based communication system might support, among others, an ACME group-based communication workspace and an Beta Corporation group-based communication workspace. Example group-based communication systems comprise supporting servers, client devices, and third-party resources. Each group-based communication workspace can include a plurality of communication channels. Users can communicate with one another via the communication channels. That is, in some examples, the group-based communication platform is a channel-based messaging platform.

In at least one example, the group-based communication system that may have multiple group-based communication workspaces. Each group-based communication workspace can be dedicated to a particular organizational group or team having a defined member list (i.e., a defined list of authenticated user accounts). In at least one example, a group-based communication workspace can be a virtual communications environment configured to facilitate user interaction with a group-based communication system. Each group-based communication workspace can be accessible and viewable (as a group-based communication interface defined below) to a select group of users, such as a group of employees of a business or organization (e.g., a ACME Corp. interface would be accessible and viewable to the ACME employees, however the Beta Corporation group-based communication workspace would not be accessible and viewable to ACME employees). The group-based communication workspace can include a plurality of communication channels (e.g., a marketing channel, sales channel, accounting channel, etc.), which can be defined herein. In various some examples, user profiles sharing a common group identifier (defined below) form part of a common group-based communication workspace.

As described above, a group-based workspace can be accessible and viewable via a group-based communication interface. A group-based communication interface can be a graphical user interface of a group-based communication system that can be configured to allow users (e.g., group members) to view and engage a group-based communication workspace. A group-based communication interface can be rendered to a client device based on data and instructions provided by the group-based communication system. In some examples, such data and instructions can be facilitated by a dedicated software application running on the client device. In some examples, such data and instructions can be provided through a web browser running on the client device.

The term "group-based communication interface" refers to a virtual communications environment configured to facilitate user interaction with a group-based communications system. Each group-based communication interface is accessible and viewable to a select group of users, such as a group of employees of a business or organization (e.g., the ACME Corp. interface would be accessible and viewable to the ACME employees however the Beta Corporation group-based communication interface would not be accessible and viewable to ACME employees). The group-based communication interface includes a plurality of communication channels (e.g., a marketing channel, sales channel, accounting channel, etc.), which can be defined herein.

A group-based communication interface is a user interface of the group-based communication system and has security sufficient such that it is accessible only to a defined group of users. As discussed herein, access may be facilitated by a group-based communication interface invitation to join transmitted by one group member user to another non-member user. As used herein, a "group-based communication interface account" is a designation to which messages may be delivered in the group-based communication system and associated with the respective group-based communication interface. The group-based communication interface account may have an identifier, referred to as a group-based communication identifier, which identifies the group-based communication interface account and may comprise ASCII text, a pointer, a memory address, and the like. For instance, the group-based communication interface identifier may be an email address (e.g., comprising a local-part, an @ symbol, then a case-insensitive domain).

In some examples, the communication platform can be associated with one or more group-based communication channels. A group-based communication channel, which can also be referred to as a "communication channel" or "channel," can refer to a virtual communications environment or feed that is configured to display messaging communications posted by communication channel members (e.g., validated users accessing the environment using client devices) that, in some examples, can be viewable only to the members of the channel. The format of the communication channel may appear differently to different members of the communication channel; however, the content of the communication channel (i.e., messaging communications) can be displayed to each member of the communication channel. For instance, a common set of group-based messaging communications can be displayed to each member of the respective communication channel such that the content of the communication channel (i.e., messaging communications) may not vary per member of the communication channel.

In some examples, communication channels can be shared between two or more different groups or organizations (e.g., associated with different identifiers). Such communication channels, which can be referred to as "external communication channels," "shared communication channels," and/or "externally shared communication channels," can be associated with risk of unintentionally sharing information with users of an external group and/or organization. That is, in a group-based communication system where communication channels can be shared with external groups and/or organizations, the sharing of sensitive information can be risky when users within the communication channels are unaware of the communication channel membership (and associated information). As a result of such risks, users may elect not to share information, or users may elect to share sensitive information that leads to unintended security breaches. That is, existing technology, as it pertains to group-based communication platforms, lacks communication channel membership information and therefor introduces risk (e.g., due to security breaches) into the use of shared communication channels. Risks associated with possible security breaches due to lack of visibility of channel membership lead to wasted computing resources dedicated to non-shared channels (e.g., a flurry of direct messages or duplication of efforts via multi-person direct messages) and/or wasted computing resources dedicated to damage control when data breaches occur (e.g., rescinding of messages, containment of leaked files, etc.).

Techniques described herein offer solutions to the problems identified above, and others, for example, by programmatically determining contextual information and presenting the contextual information in a convenient manner so that users of the group-based communication platform are aware of communication channel membership. The determination and/or presentation of contextual information can mitigate risk associated with externally shared channels and can conserve computing resources that would otherwise be consumed and/or dedicated to non-shared channels and/or damage control, as described above. In some examples, contextual information can be determined and/or presented upon detecting non-keystroke engagement with a message composition interface. In such examples, techniques described herein can provide minimal information and only when necessary, thereby reducing clutter within a group-based communication interface.

Techniques described herein can further improve conventional techniques associated with group-based communication platforms for example, by determining and/or presenting contextual information in association with message composition. For example, if a user is presented with context related to the message he/she is about to compose, the user can have a better understanding of the recipient of such a message. Such contextual information may be generated based on a corpus of information in a programmatic manner using machine learning. Such contextual information can therefore mitigate risk and/or otherwise enhance the user experience of such a user.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example some examples may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which some examples of the present disclosure may operate. Users may access a group-based communication system 200 via a communications network 102 using client devices 101A-101N. In at least one example, a user can be an individual, group of individuals, business, organization, and the like. The users referred to herein can be enabled to access a group-based communication system using client devices. Each user of the group-based communication system can be associated with at least one group identifier, which can be a unique number. For example, in one embodiment, a group identifier may be stored as a 64 bit unsigned integer and represented externally (outside of memory) as a base-34 encoded string. The client devices 101A-101N can be computer hardware and/or software configured to access a service made available by a server. The server can be on another computer system, in which case a client device can access the server the service by way of a network. Client devices 101A-101N may include, without limitation, smart phones, tablet computers, laptop computers, wearables, personal computers, enterprise computers, and the like.

In at least one example, the example computing system 100 can include a group-based communication system 105. In at least one example, the term "group-based" is used herein to refer to a system, channel, communication, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) can be used to associate data, information, messages, users, communication channels, etc., with specific groups of a group-based communication system as defined below.

The group-based communication system 105 may comprise a group-based communication server 106 in communication with at least one group-based communication repository 107. The group-based communication server 106 may be embodied as a computer or computers. In at least one example, the group-based communication server 106 can be a software platform and associated hardware that is configured to manage access to one or more group-based communication workspaces (defined below) of the group-based communication system 105. The group-based communication system 105. The group-based communication server 106 can be configured to access, maintain, and support application product logic of the group-based communication system 105 and to access one or more data repositories such as a group-based communication repository 107.

Users may further access features or services of one or more external resources 103A-103N through the group-based communication system 105.

In at least one example, communications network 102 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 102 may include a cellular telephone, an 802.11, 802.16, 802.20, and/or WiMax network. Further, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some examples, the protocol is a custom protocol of JSON (JavaScript Object Notation) objects sent via a Websocket channel. In some examples, the protocol is JSON over RPC ("remote procedural call), JSON over REST ("Representational State Transfer")/HTTP ("HyperText Transfer Protocol"), and the like.

In at least one example, the group-based communication server 106 may provide for receiving of electronic data from various sources, including but not necessarily limited to the client devices 101A-101N, over the communications network 102. For example, the group-based communication server 106 may be operable to receive and post or transmit group-based messaging communications provided by the client devices 101A-101N. In at least one example, the group-based communication server 106 can be operable to receive and post or transmit any type of data, content, digital content, digital content objects, information, and/or the like. As used herein, the terms "data," "content," "digital content," "digital content object," "information," and/or the like may be used interchangeably to refer to data capable of being transmitted, received, and/or stored in accordance with techniques described herein. Thus, use of any such terms should not be taken to limit the spirit and scope of some examples of the present invention. Further, where a computing device is described herein to receive data from another computing device, it can be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it can be appreciated that the data may be transmitted directly to another computing device or may be transmitted indirectly via one or more intermediary computing devices, such as, for example, one or more servers, relays, routers, network access points, base stations, hosts, and/or the like.

The group-based communication repository 107 may be embodied as a data storage device(s) such as a Network Attached Storage (NAS) device or devices, or as a separate database server or servers. The group-based communication repository 107 can include information accessed and stored by the group-based communication server 106 to facilitate the operations of the group-based communication system 105. For example, the group-based communication repository 107 may include, without limitation, a plurality of messaging communications organized among a plurality of communication channels, a plurality of user-defined channel title text components, a plurality of user identifiers, and/or the like.

In at least one example, the group-based communication repository 107 can refer to the location, such as a memory device, where one or more user activity data logs or other group-based communication data can be stored. The group-based communication repository 107 may be a dedicated device and/or a part of a larger repository. The group-based communication repository 107 may be dynamically updated or be static. For example, the user activity data logs may be uploaded to the group-based communication repository 107 simultaneously with the creation of the user activity data logs. Alternatively, the user activity data logs may not be uploaded simultaneously with their creation and instead may be batch uploaded based on other factors, such as based on time intervals (e.g., uploads occur every 15 minutes), user initiation (e.g., user may press a button to initiate the upload), or the like. The group-based communication repository 107 may be encrypted in order to limit unauthorized access of user activity data logs and associated engagement data.

As described above, the group-based communication repository 107 can store group-based communication data. In at least one example, group-based communication data can refer to information accessed and stored by the group-based communication server 106 to facilitate the operations of the group-based communication system 105. For example, the group-based communication data may include, without limitation, group-defined channel title template(s), user-defined channel title text component(s), user profile data, group channel data, channel data, channel title data, channel title recency data, channel activity data, user identifiers, channel-creator user identifiers, group identifiers, channel metadata, channel title description component(s), and/or the like.

The client devices 101A-101N may be any computing device as defined above. That is, the client devices 101A-101N may be a desktop, a laptop, a tablet, a smartphone, and/or the like that is executing a client application (e.g., a group-based communication app). Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In some examples where a client device 101A-101N is a mobile device, such as a smartphone or tablet, the client device 101A-101N may execute an "app" to interact with the group-based communication system 105. Such apps can be typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 101A-101N may interact with the group-based communication system 105 via a web browser. As yet another example, the client devices 101A-101N may include various hardware or firmware designed to interface with the group-based communication system 105.

Each of external resources 103A-103N represents an external system, resource, service, software application, computer, or the like, that a user of a client device associated with a corresponding group-based communication system user account may access via the group-based communication system 105. In at least one example, an external resource can be a software program, application, platform, or service that is configured to communicate with the group-based communication system 105 for providing an external service (i.e., not native to the group-based communication system) to a client device via a group-based communication interface and/or via a group-based communication workspaces. In at least one example, the group-based communication system 105 may access an external resource via one or more application programming interfaces (APIs). An external resource may provide a specific service via a group-based communication interface of the group-based communication system 105. In one example, an external resource 103A may be a validated software source code repository, or the like, which members of a group-based communication workspace may collectively access as they collaborate to develop a new software application.

An external resource 103A-103N may be embodied in a variety of ways utilizing a variety of computing devices. For example, an external resource 103A-103N may be a computer or server remote from the group-based communication system 105 and accessible over the communications network 102 (e.g., over the Internet for example). In some examples, an external resource can be associated with an external resource user identifier. An external resource user identifier can comprise one or more items of data by which a user (or user profile) of an external resource may be uniquely identified by a group-based communication system. For example, an external resource user identifier may comprise ASCII text, a pointer, a memory address, and the like. One or more external resource user identifiers may be stored to a user profile of a group-based communication system along with other identifiers (e.g., user identifier, group identifiers, communication channel identifiers, etc.). The external resource user identifier may be embodied in a format native to the external resource or may be structured in a format designated by the group-based communication system. Correlating one or more external resource user identifiers to a user account or user identifier of the group-based communication system allows the group-based communication system to link accounts from disparate external resources with a selected group-based communication system user account. The external resource user identifier may include an integer identifier, a universally unique identifier, an email address, a random string, and/or the like. In such a case, the group-based communication server may receive the external resource user identifier during the open authorization (OAuth) process.

In some examples, the group-based communication system 105 is configured to access an external resource utilizing an external resource user identifier stored by the group-based communication system 105, such as in group-based communication repository 107. The external resource user identifier may include, or otherwise be associated with and retrievable together with, an external resource access token associated with the external resource and/or group-based communication system user account. A group-based communication system 105 may store one or more external resource user identifiers including or associated with an external resource access token(s) to enable API requests to the external resource.

In some examples of the group-based communication system 105, a message or messaging communication may be sent from a client device 101A-101N to a group-based communication system 105. In at least one example, a message or message communication may be sent to the group-based communication system 105 over communications network 102 directly by a client device 101A-101N, the message or message communication may be sent to the group-based communication system 105 via an intermediary such as a message server, and/or the like. The terms "message" and/or "messaging communication" can refer to any electronically generated digital content object provided by a user using a client device and that is configured for display within a communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel of the group-based communication system can include metadata comprising the following: a sending user identifier, a message identifier, message contents, a timestamp that identifies the time of the message, a group identifier, and a communication channel identifier. Each of the foregoing identifiers may comprise ASCII text, a pointer, a memory address, and the like. In at least one example, the message or message communication may additionally or alternatively include data such as message contents (e.g., text, emojis, images, videos, links, etc.), attachments (e.g., files), message hierarchy data (e.g., the message may be a reply to another message), third party metadata, and/or the like.

In at least one example, a user identifier can comprise one or more items of data by which a user and the user's corresponding user account may be identified within a group-based communication system. For example, a user identifier may comprise ASCII text, a pointer, a memory address, or other unique identifier. The terms "user profile," "user account," and "user account details" can refer to information of the group-based communication system 105 that is associated with a user, including, for example, a user identifier, one or more communication channel identifiers associated with communication channels that the user has been granted access to, one or more group identifiers for groups with which the user is associated, an indication as to whether the user is an owner of any communication channels, an indication as to whether the user has any communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, and the like. The user profile details can include a subset designation of user credentials, such as, for example, login information for the user including the user's username and password.

For the purpose of this discussion, a sending user identifier can be associated with a collection of messages that can be sent by a particular user (e.g., sent by a client device associated with the particular user, user identifier, or user profile). These messages may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like.

In at least one example, a group identifier or a team identifier can comprise one or more items of data by which a group or team within a group-based communication system may be identified. For example, a group identifier may comprise ASCII text, a pointer, a memory address, and the like. Group identifiers can be used to distinguish communication channels, messages, files, members, etc., associated with one group-based communication workspace from another group-based communication workspace.

The terms "group-based communication organization identifier" or "organization identifier" can refer to one or more items of data by which an organization within a group-based communication system may be identified. For example, an organization identifier may comprise ASCII text, a pointer, a memory address, and the like.

In at least one example, a communication channel identifier or channel identifier can comprise one or more items of data by which a communication channel may be identified. For example, a communication channel identifier may comprise ASCII text, a pointer, a memory address, and the like.

In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL   <digital_cert_link>
www.mydigitalcertificate.com/
JohnDoeDaDoeDoe@gmail.com/mycertifcate.dc</digital_cert_link>
            //OPTIONAL <digital_certificate>
_DATA_</digital_certificate>
        </user_account_credentials>
    </user_accounts_details>
    <client_details> //iOS Client with App and Webkit
        //it should be noted that although several client details
        //sections can be provided to show example variants of client
        //sources, further messages will include only on to save
        //space
        <client_IP>10.0.0.123</client_IP>
        <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
        <client_product_type>iPhone6,1</client_product_type>
        <client_serial_number>DNXXX1X1XXXX
</client_serial_number>
    <client_UDID>3XXXXXXXXXXXXXXXXXXXXXXXXXD
</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
        <client_product_type>iPhone6,1</client_product_type>
        <client_serial_number>DNXXX1X1XXXX
</client_serial_number>
    <client_UDID>3XXXXXXXXXXXXXXXXXXXXXXXXXD
</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
```

-continued

```
    </client_details>
    <client_details>//Android Client with Webbrowser
        <client_IP>10.0.0.123</client_IP>
        <user_agent_string>Mozilla/5.0 (Linux; U; Android 4.0.4;
en-us; Nexus S Build/IMM76D) AppleWebKit/534.30 (KHTML, like
Gecko) Version/4.0 Mobile Safari/534.30</user_agent_string>
        <client_product_type>Nexus S</client_product_type>
        <client_serial_number>YXXXXXXXXZ
</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X
10_9_3) AppleWebKit/537.75.14 (KHTML, like Gecko) Version/
7.0.3 Safari/537.75.14</user_agent_string>
        <client_product_type>MacPro5,1</client_product_type>
        <client_serial_number>YXXXXXXXXZ
</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team identifier>
        <channel_identifier>ID_channel_1</channel_identifier>
        <body contents>That is an interesting invention. I have
attached a copy our patent policy.</body contents>
        <attachments>patent_policy.pdf</attachments>
    </message>
</auth_request>
```

In at least one example, the group-based communication server 106 may create a storage message based upon the received message to facilitate message indexing and storage in a group-based communication repository 107. In one implementation, the storage message may include data such as a message identifier, a group identifier, a communication channel identifier, a sending user identifier, topics, responses, message contents (i.e., body contents), attachments, message hierarchy data, third party metadata, conversation primitive data, and/or the like. For example, the group-based communication apparatus 205 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_ identifier>
    <sending_user_identifier>ID_user_1</sending_user_identifier>
    <topics>
        <topic>disclosures</topic>
        <topic>patents</topic>
        <topic>policies</topic>
    </topics>
    <responses>
```

-continued

```
    <response>liked by ID_user_2</response>
    <response>starred by ID_user_3</response>
  </responses>
  <body contents>That is an interesting disclosure. I have attached a
copy our patent policy.</body contents>
    <attachments>patent_policy.pdf</attachments>
    <conversation_primitive>
      conversation includes messages: ID_message_8, ID_message_9,
ID_message_10,
      ID_message_11, ID_message_12
    </conversation_primitive>
  </storage_message>
```

In some examples, a sending user identifier may be associated with the message communication. In one implementation, the message may be parsed (e.g., using PHP— i.e., the script language derived from Personal Home Page Tools—commands) to determine a sending user identifier of the user who sent the message.

In some examples, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some examples, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the communication channel in response to the message), downloading a file associated with the message, sharing the message from one communication channel to another communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
    SELECT messageResponses
    FROM MSM_Message
    WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some examples, attachments may be included with the message. If there can be attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some examples, third party metadata may be associated with the message. For example, third party metadata may provide additional context regarding the message or the user that is specific to a company, group, a group-based communication workspace, a communication channel, and/or the like. In one implementation, the message may be parsed (e.g., using PHP commands) to determine third party metadata. For example, third party metadata may indicate whether the user who sent the message is an authorized representative of the communication channel (e.g., an authorized representative may be authorized by the company to respond to questions in the communication channel).

In some examples, a conversation primitive may be associated with the message. In one implementation, a conversation primitive can be an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the communication channel) and/or proximity (e.g., message send order proximity, message send time proximity) of these messages.

In some examples, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages can be indexed separately (e.g., in a separate index associated with the group and/or company that is not shared with other groups and/or companies). In one implementation, messages may be indexed at a separate distributed repository (e.g., to facilitate data isolation for security purposes).

If there can be attachments associated with the message, file contents of the associated files may be used to index such files in group-based communication repository 107 to facilitate searching. In one embodiment, the files may be indexed such that a company's or a group's files can be indexed at a separate distributed repository.

Users of the group-based communication system 105 may join communication channels. Some communication channels may be globally accessible to those users having a particular organizational group identifier associated with their user profile (i.e., users who can be members of the organization). Access to some communication channels may be restricted to members of specified groups, whereby the communication channels can be accessible to those users having a particular group identifier associated with their user profile. The communication channel identifier may be used to facilitate access control for a message (e.g., access to the message, such as having the message return as part of search results in response to a search query, may be restricted to those users having the communication channel identifier associated with their user profile, or who have the ability to join the communication channel). The communication channel identifier may be used to determine context for the message (e.g., a description of the communication channel, such as a description of a project discussed in the communication channel, may be associated with the communication channel identifier).

A "private communication channel" can refer to a communication channel with restricted access settings such that it is not generally accessible and/or searchable by other members of the group-based communication system 105 (i.e., members associated with other group-based communication workspaces). For example, only those users or administrators who have knowledge of and permission to access (e.g., a communication channel identifier for the private communication channel is associated with their user profile after the user has been validated/authenticated) the private communication channel may view content of the private communication channel.

The term "permitted communication channel(s)" can refer to one or more communication channels or private communication channels that have been approved or authenticated for access by a user (e.g., a user profile) associated with a selected user identifier.

In some examples, the group-based communication system 105 may provide for "one-sided viewing" with shared communication channel attributes (e.g., name, purpose, topic), shared communication channel controls (e.g., access controls, viewing privilege settings), and shared communication channel interfaces that can be configurable to be different on each side of the externally shared communication channel. For example, the shared communication channel attributes, controls, and interfaces on each side of the externally shared communication channel may be configurable by a user, administrator, or the group-based communication system 105 (e.g., automatically and without user interaction). For example, even though the group-based system 105 maintains the sharding for the externally shared communication channel, the attributes, controls, and interfaces of the externally shared communication channel may be different on each side so that a first organization (e.g., an agency having many people flowing in and out of the externally shared communication channel) that needs the externally shared communication channel to be public can share the externally shared communication channel with a second organization (e.g., a company creating a private document) that needs the externally shared communication channel to be private. In some instances, these attributes and controls architecturally may be included in a single table but split out into attributes per organization or team. Such "one-sided viewing" provided by the group-based communication system 105 allows for messages, attachments, and content communicated over the externally shared communication channel to be "public" for members of the first organization and "private" for members of the second organization. In an illustrative example, the group-based communication system 105 may provide equal control over attributes around name so that organizations with different workflows may utilize different names for the externally shared communication channel. For example, the externally shared communication channel may have a different name that is actively being used by the members of each organization.

In one illustrative example, the organization X side of the externally shared communication channel may have different attributes and controls and a different interface than the organization Y side of the externally shared communication channel. In another illustrative example, the group-based communication system 105 provides for a member of organization X to broadcast (e.g., by a message server in real-time) a public message over the externally shared communication channel to members of both organization X and organization Y. The group-based communication system 105 further provides for a member of organization Y to transmit (e.g., by the message server in real-time) a private message over the externally shared communication channel to members of organization Y but not to members of organization X. The group-based communication system 105 further provides for storing (e.g., by a network application server) the public message and the private message in a main database and allowing (e.g., by the network application server) members of either organization X or organization Y to search for and access the public message while allowing (e.g., by the network application server) only members of organization Y to search for and access the private message. For example, the group-based communication system 105 may: index a public message transmitted by a member of organization X or organization Y in a shared index accessible to members of organization X and members of organization Y; index a private message transmitted by a member of organization X in a first separate index accessible to members of organization X but not accessible to members of organization Y; and index a private message transmitted by a member of organization Y in a second separate index accessible to members of organization Y but not accessible to members of organization X.

In some examples, the group-based communication system 105 may store the attributes and controls of the externally shared communication channel architecturally in a single table but split out the stored attributes and controls into attributes and controls per organization. For example, the group-based communication system 105 may store the privacy or publicness of a channel as an attribute in a channel row of an association table stored in a database. For shared communication channels, the group-based communication system 105 may generate a separate association table per organization. The group-based communication system 105 may store in the channel row all of the static information (e.g., facts that cannot be changed or configured by a user) for the shared communication channel, such as when the shared communication channel was created, when the shared communication channel was last updated, who made the shared communication channel, and the like. In some examples, the group-based communication system 105 may generate a separate association table for the shared communication channel that comprises the configurable attributes and controls per organization (e.g., per each of the two or more organizations that can be in the shared communication channel). For example, the group-based communication system 105 may generate an association table having two or more rows (e.g., one row for each of the two or more organizations in the shared communication channel) comprising data indicative of those attributes and controls, serialized down to the clients. The group-based communication system 105 may generate different user interfaces for the shared communication channel based on the attributes and controls for each organization in the shared communication channel. In some instances, one organization in the shared communication channel will not know if another organization in the shared communication channel has different settings, attributes, or controls.

In some examples, continuing from the discussion above, the organization X side of the externally shared communication channel may have different attributes and controls and a different interface than the organization Y side of the externally shared communication channel. In some examples, the group-based communication system 105 provides for a member of organization X to broadcast (e.g., by a message server in real-time) a public message over the externally shared communication channel to members of both organization X and organization Y. The group-based communication system 105 further provides for a member of organization Y to transmit (e.g., by the message server in real-time) a private message over the externally shared communication channel to members of organization Y but not to members of organization X. The group-based communication system 105 further provides for storing (e.g., by a network application server) the public message and the private message in a main database and allowing (e.g., by the network application server) members of either organization X or organization Y to search for and access the public message while allowing (e.g., by the network application server) only members of organization Y to search for and access the private message. For example, the group-based communication system 105 may permit members of organization X and organization Y to search for and access the public message while permitting a member of organization Y, but not a member of organization X, to search for and access the private message.

In some examples, if organization Y has configured the shared communication channel to be private, and if a member of organization Y changes the topic of the shared communication channel, the real-time messaging server (e.g., the message server 107, the apparatus 200) disclosed herein may be configured to broadcast that change as a message (e.g., a private general message) in the shared communication channel only to organization Y but not to organization X. Further the network application server (e.g., the network application server 109, the apparatus 300) disclosed herein may be configured to store and provide search access to that change as history (e.g., a private storage message) in the shared communication channel only to organization Y but not to organization X. As a result, only one side, organization Y, will be able to see that information.

In at least one example, a user can interact with a client device to submit a channel creation request. A channel creation request can comprise an electrically generated digital object that indicates that a user has provided an input comprising a request to create a communication channel. A channel creation request may be represented via a temporary code that notifies a recipient that a user has made the request. To provide further context, a channel creation request is generated in response to a user interaction with a group-based communication interface presented on a display screen of a client device. A user causes the client device to generate a channel creation request by interacting with, for example, a specific channel-creation actuator button that forms part of the group-based communication interface.

Example Apparatus for Implementing Embodiments of the Present Disclosure

Figure 2:
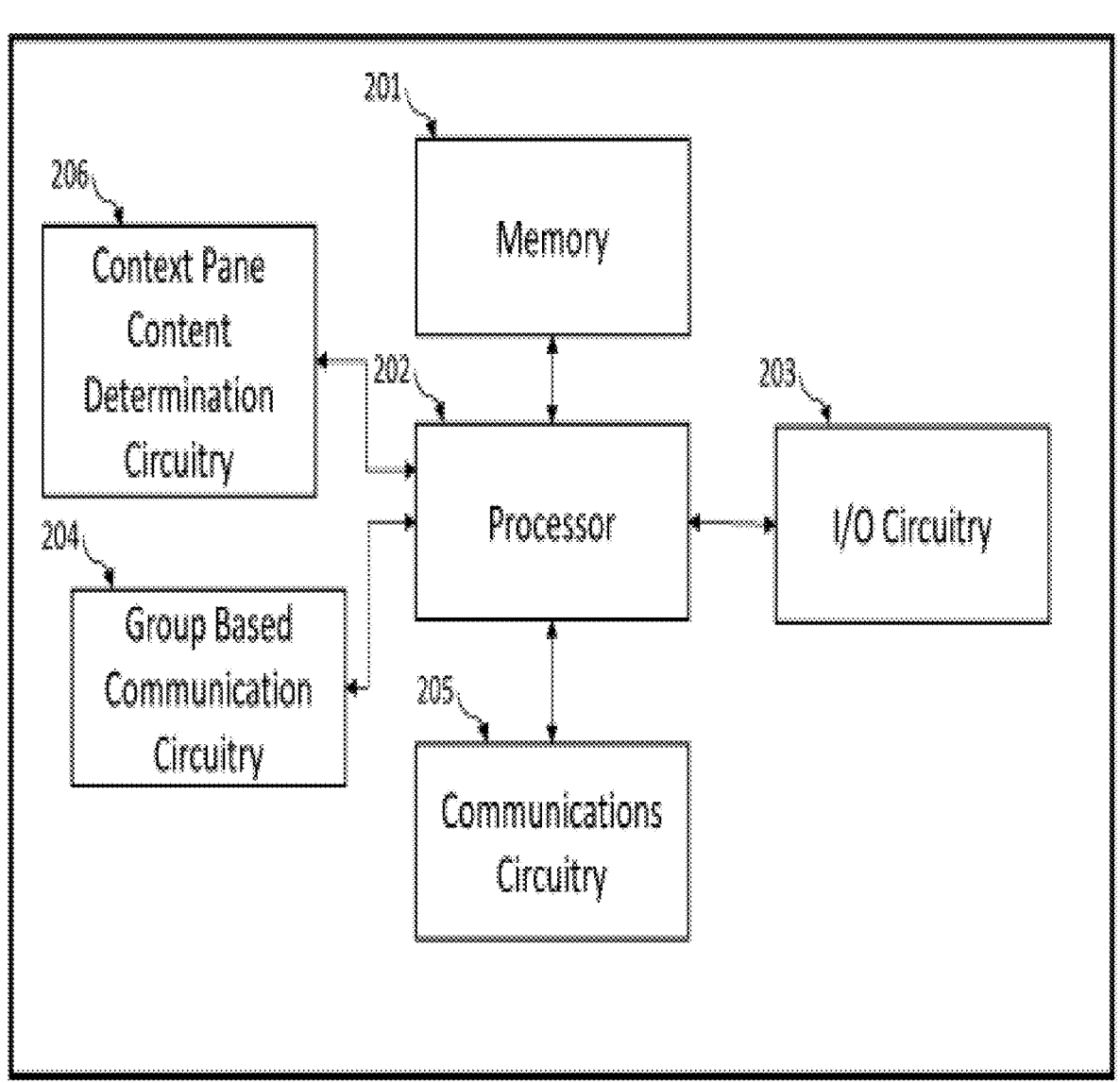
FIG. 2 illustrates a schematic of an example apparatus associated with a communication platform according to some examples of the present disclosure.

The group-based communication server 106 may be embodied by one or more computing systems, such as group-based communication apparatus 200 shown in FIG. 2. The group-based communication apparatus 200 may include a processor 202, a memory 201, input/output circuitry 203, communications circuitry 205, group-based communication circuitry 204, and context pane content determination circuitry 206. The apparatus 210 may be configured, using one or more of the circuitry 203, 204, 205, and 206, to execute the operations described herein.

Although the components can be described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

For the purpose of this discussion, the term "circuitry" can broadly include hardware and, in some examples, software for configuring the hardware. For example, in some examples, "circuitry" may include processing circuitry, storage media, network interfaces, input/output devices, and the like. In some examples, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some examples, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the group-based communication apparatus 200 to carry out various functions in accordance with example some examples of the present disclosure.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions can be executed.

As just one example, the processor 202 may be configured to maintain one or more communication channels connecting a plurality of client devices 101A-101N (shown in FIG. 1) to enable message sharing therebetween. The processor 202 ensures that messages intended for exchange between the client devices 101A-101N within the particular communication channel can be properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In some examples, the processor 202 may provide stored and/or indexed messages for dissemination to client devices 101A-101N. The processor 202 may also provide to distribute such stored and/or indexed messages across various group-based communication workspaces and associated communication channels as discussed herein.

In some examples, the group-based communication apparatus 200 may include input/output circuitry 203 that may, in turn, be in communication with processor 202 to provide output to the user and, in some examples, to receive an indication of a user input. The input/output circuitry 203 may comprise a user interface (e.g., a group-based communication interface) and may include a display and may comprise a web user interface, a mobile application, a client device, a kiosk, or the like. In some examples, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the group-based communication apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 204 can include hardware and software configured to support a group-based communication system 105. The group-based communication circuitry 204 may utilize processing circuitry, such as the processor 202, to perform these actions. The group-based communication circuitry 204 may send and/or receive data from group-based communication repository 107. In some implementations, the sent and/or received data may be group-based communication objects (e.g., messages, files, links, etc.) organized among a plurality of communication channels. It should also be appreciated that, in some examples, the group-based communication circuitry 204 may include a separate processor, specially configured field programmable gate array (FPGA), or application specific interface circuit (ASIC).

In at least one example, the term "group-based communication object" can refer to electronic data objects or digital content objects specifically executable and/or otherwise accessible via the group-based communication system 105 and/or at least one external resource of the external resources 103A-103N. Group-based communication objects may be received at the group-based communication system 105 by receiving those group-based communication objects conveyed to (pushed to) the group-based communication system 105, or the group-based communication system 105 may retrieve (pull to) various group-based communication objects stored within accessible storage areas of the one or more client devices 101A-101N, external resources 103A-103N, and/or the like. The group-based communication objects can include body content data and metadata. The body content data of the group-based communication objects may be interpreted by the group-based communication apparatus 200 to display or otherwise convey human-readable representations of information and/or computer-executable content that causes a particular client device to operate in a particular way. Specifics of certain group-based communication objects examples can be discussed herein, however, it should be understood that in some examples, group-based communication objects may be embodied as messaging communications, emails, events, audio files, video files, document files, spreadsheet files, presentation files, tasks, and/or the like; as well as any contextual data corresponding therewith. Group-based communication objects may thus be non-personal (alternatively referred to as public) as they can be exchanged between a plurality of users or otherwise made available to a plurality of users. Alternatively, group-based communication objects may be personal in nature (e.g., as defined by a portion of metadata associated with the group-based communication object), such that access to the content of the group-based communication object is limited to a single user (or a limited number of defined users). For example, group-based communication objects personal to a single user may encompass tasks or task lists defined personally by and for a particular user. Access to personal group-based communication objects may be limited to access requests associated with defined user identifiers. In some examples, personal group-based communication objects may be represented as encrypted data when indexed in database storage areas and/or when included within work graph data structures including personal and non-personal group-based communication objects.

The context pane content determination circuitry 206 includes hardware and software configured to support context pane related functionality, features, and/or services of the group-based communication system 200. The context pane content determination circuitry 206 may utilize processing circuitry, such as the processor 202, to perform these actions. The context pane content determination circuitry 206 may send and/or receive data from group-based communication repository 107. In some implementations, the sent and/or received data may be group-based communication objects or other data of a group-based communication data corpus. It should also be appreciated that, in some examples, the context pane content determination circuitry 206 may include a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 200. In some examples, one or more external systems (such as a remote cloud computing and/or data storage system, one or more external resources 103A-103N) may also be leveraged to provide at least some of the functionality discussed herein.

As described above and as will be appreciated based on this disclosure, some examples of the present disclosure may be configured as methods, mobile devices, frontend graphical user interfaces, backend network devices, and the like. Accordingly, some examples may comprise various means including entirely of hardware or any combination of software and hardware. Furthermore, some examples may take the form of a computer program product on at least one non-transitory computer-readable storage medium having computer-readable program instructions (e.g., computer software) embodied in the storage medium. Similarly, some examples may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server can be generally remote from each other and typically interact through a communication network. The relationship of client and server arises by virtue of computer programs running on the respective computers and having a client-server relationship to each other. In some examples, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular some examples of particular inventions. Certain features that can be described herein in the context of separate some examples can also be implemented in combination in a single embodiment. Conversely, various features that can be described in the context of a single embodiment can also be implemented in multiple some examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations can be depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the some examples described above should not be understood as requiring such separation in all some examples, and it should be understood that the described program components and systems can generally be integrated together in a single software product or packaged into multiple software products. Any operational step shown in broken lines in one or more flow diagrams illustrated herein can be optional for purposes of the depicted embodiment.

Thus, particular some examples of the subject matter have been described. Other some examples can be within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Context Pane Generation & Presentation

Figure 3A:
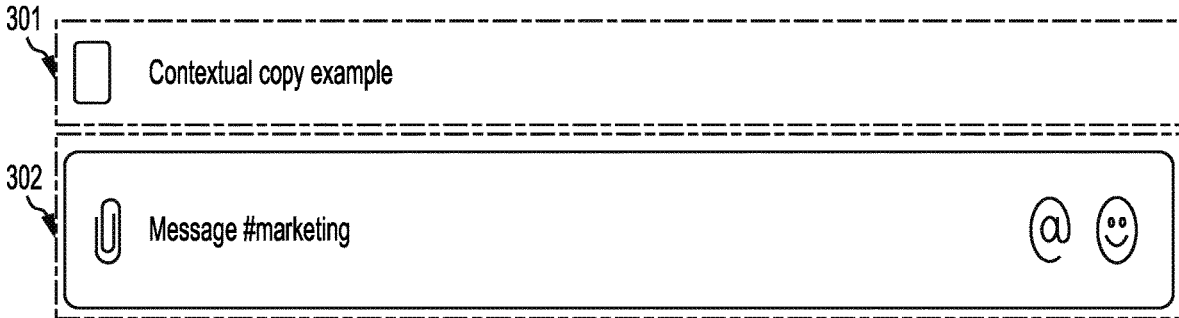
FIGS. 3A-3V illustrate example message composition interfaces and context panes configured in accordance with some examples of the present disclosure.
Figure 3B:
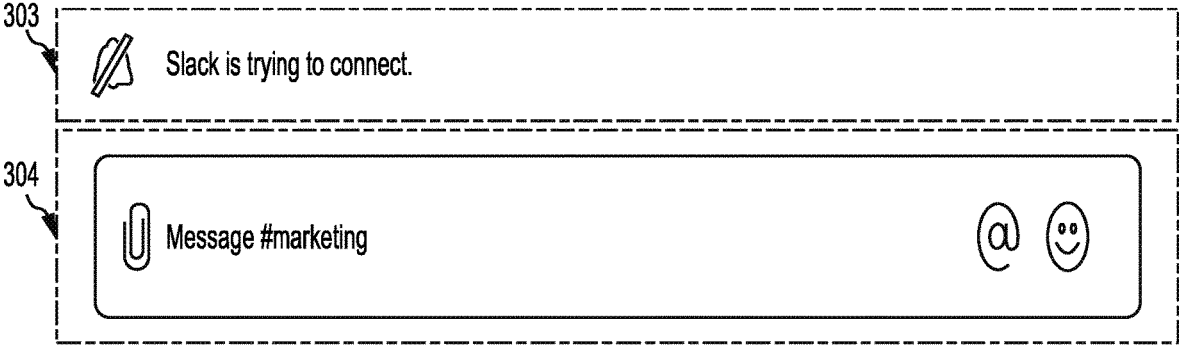
Figure 3C:
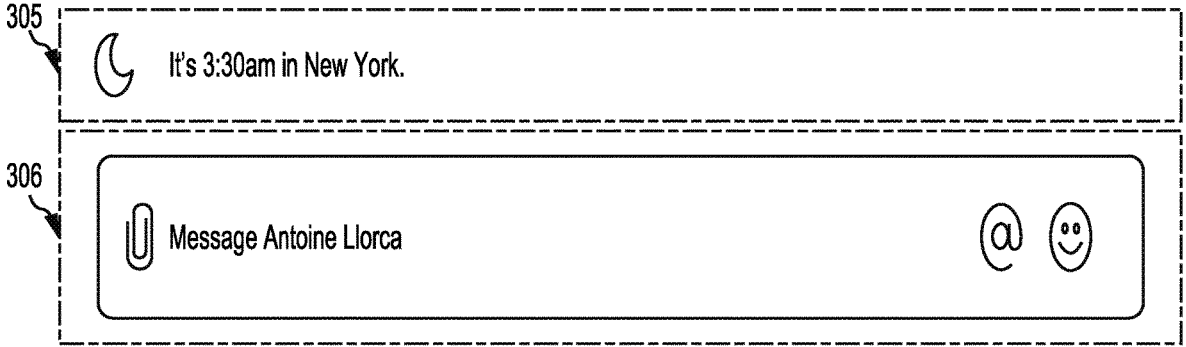
Figure 3D:
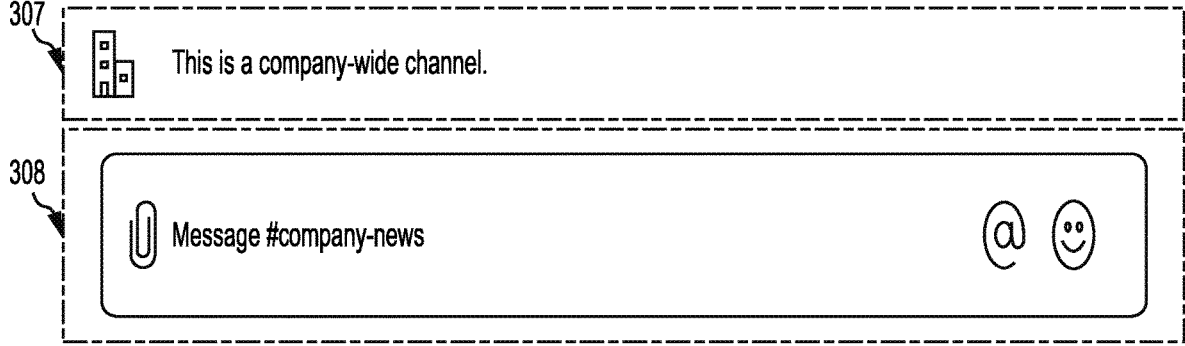
Figure 3E:
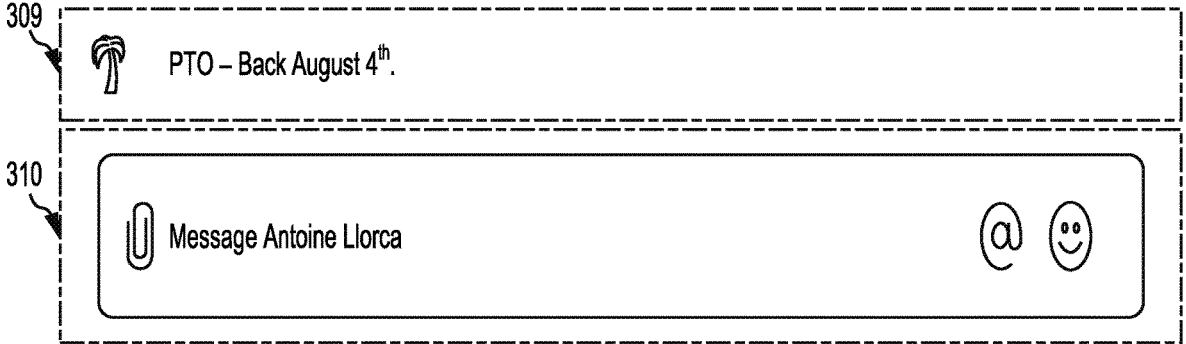
Figure 3F:
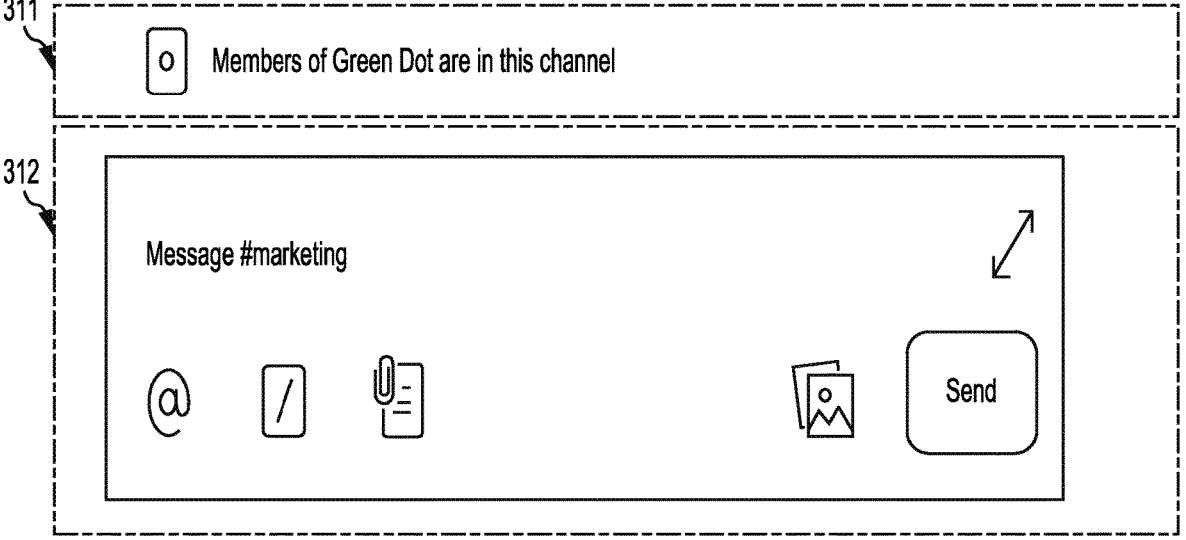
Figure 3G:
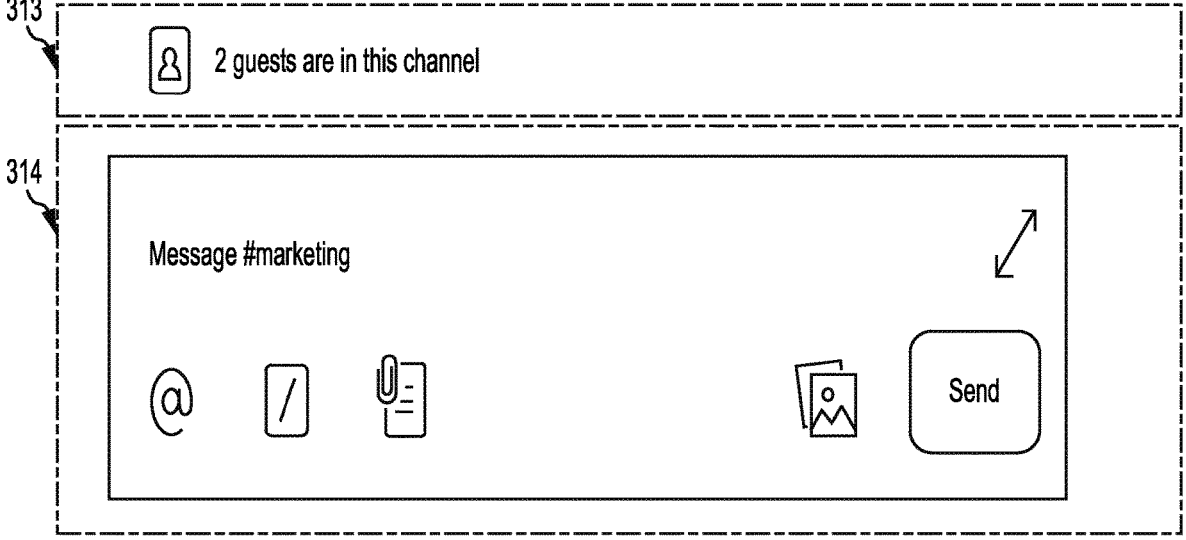
Figure 3H:
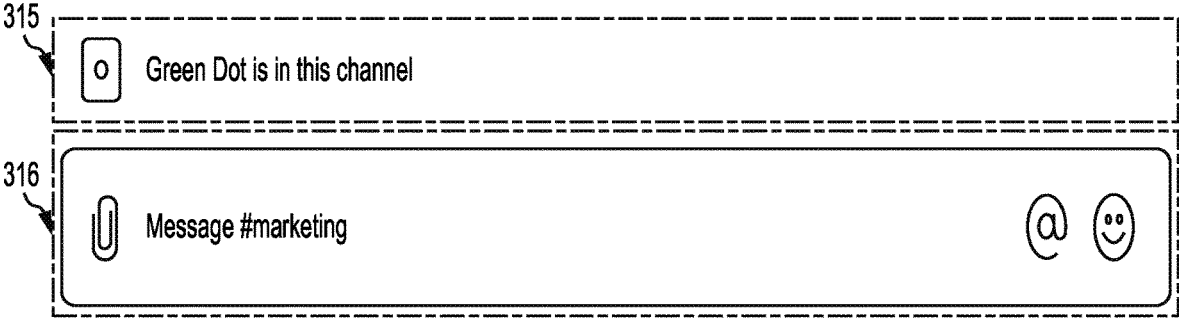
Figure 3I:
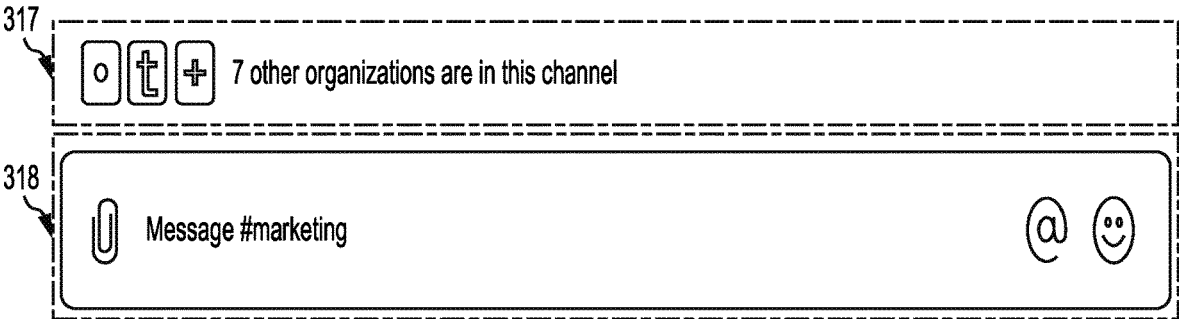
Figure 3J:
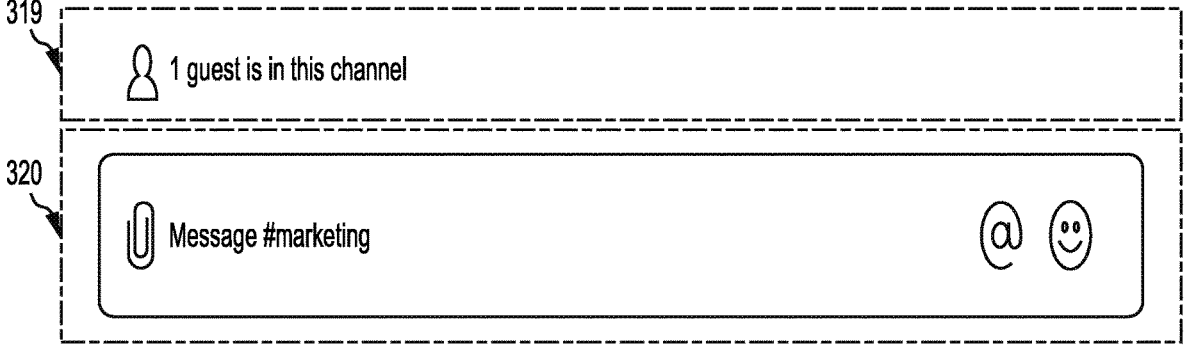
Figure 3K:
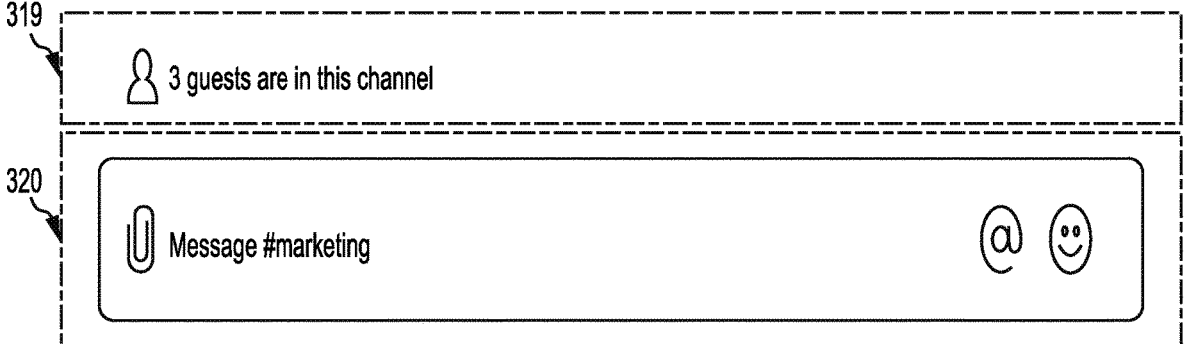
Figure 3L:
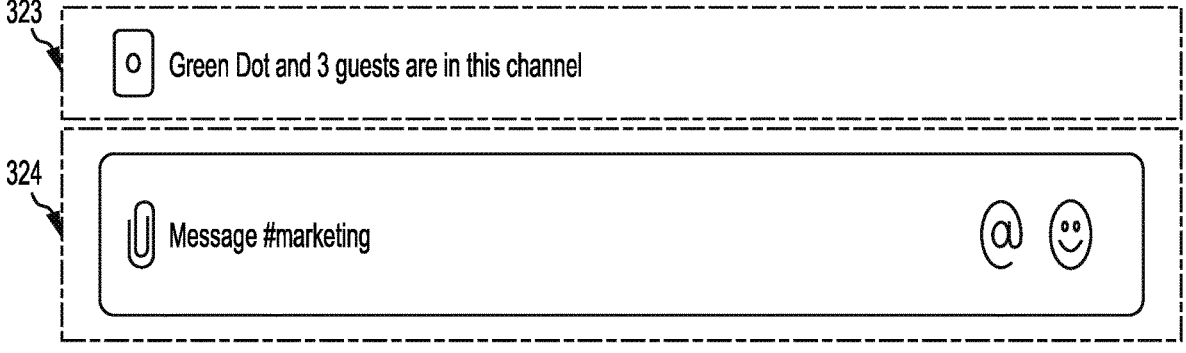
Figure 3M:
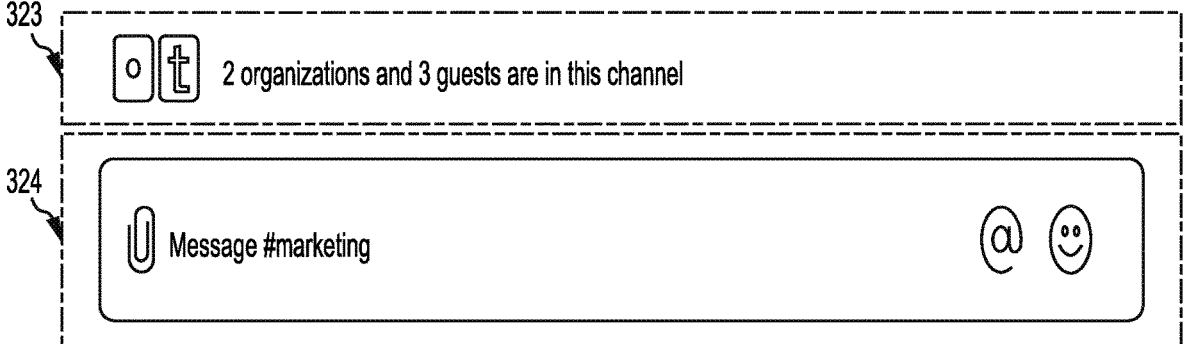
Figure 3N:
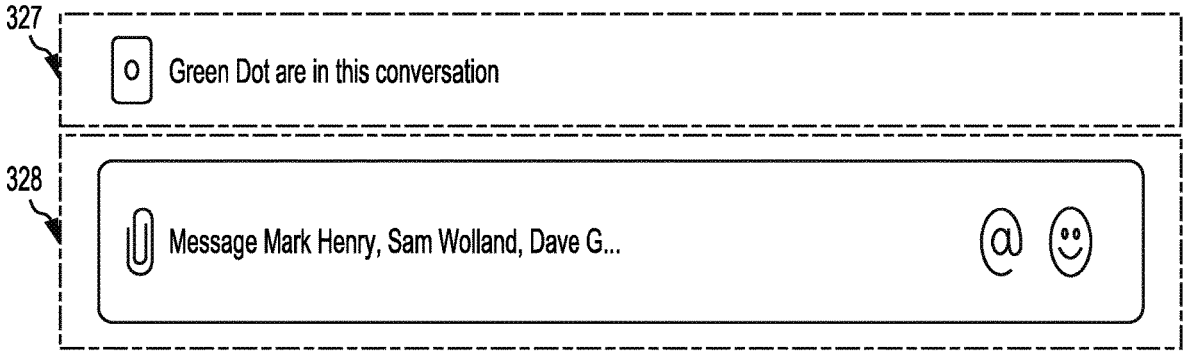
Figure 3O:
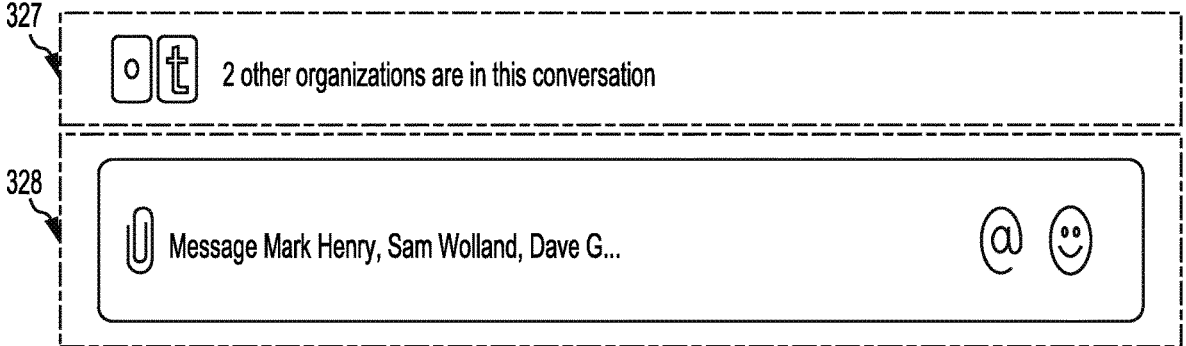
Figure 3P:
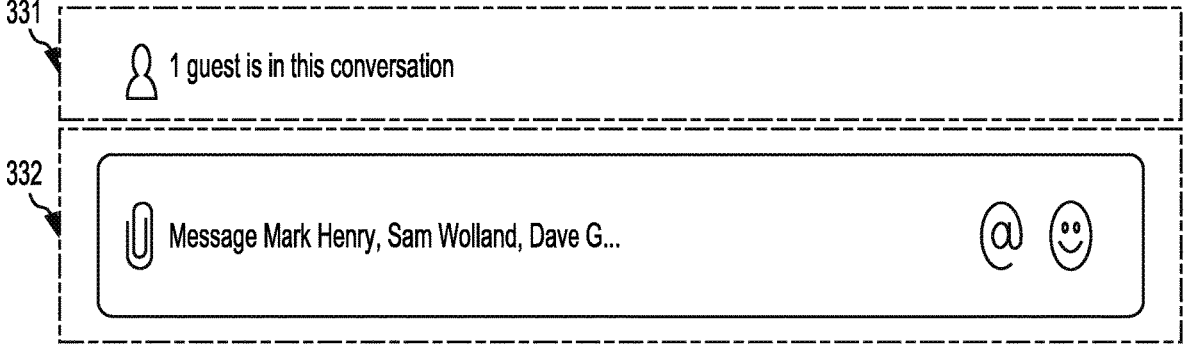
Figure 3Q:
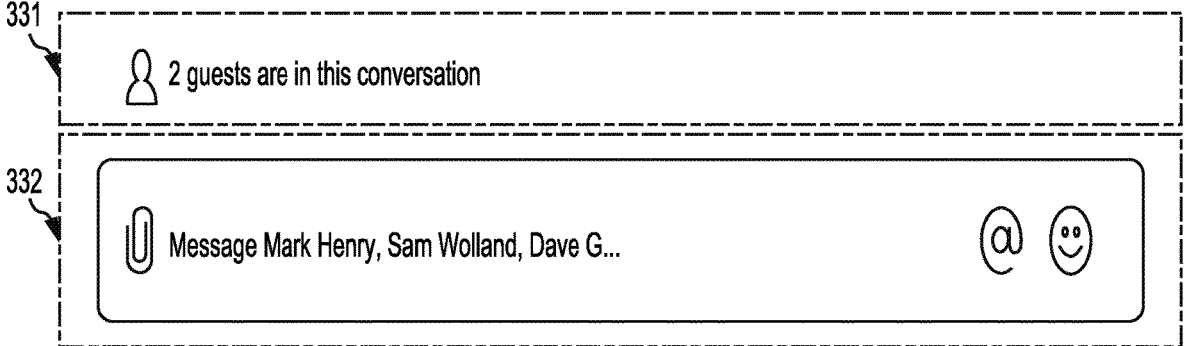
Figure 3R:
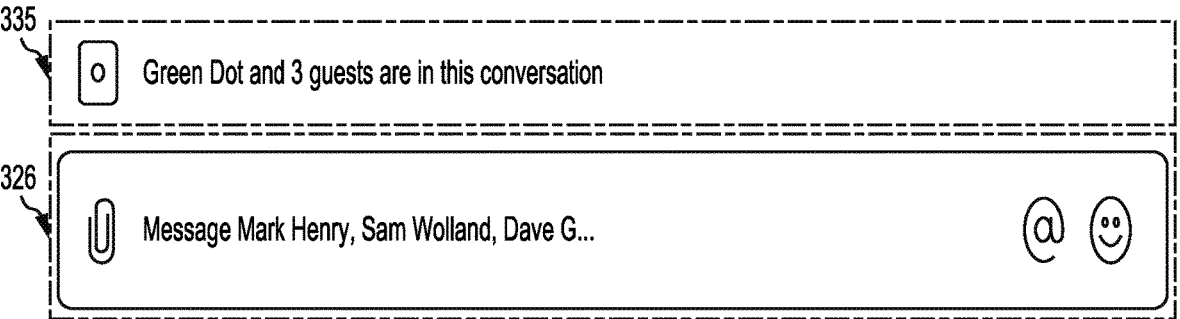
Figure 3S:
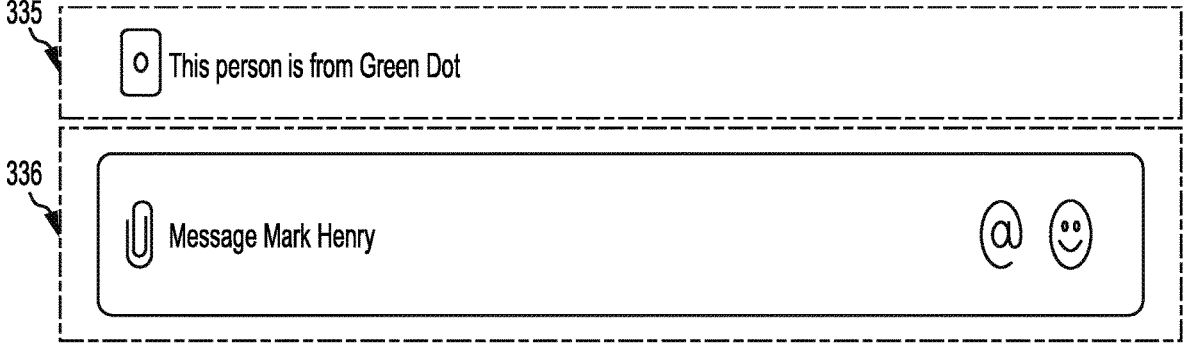
Figure 3T:
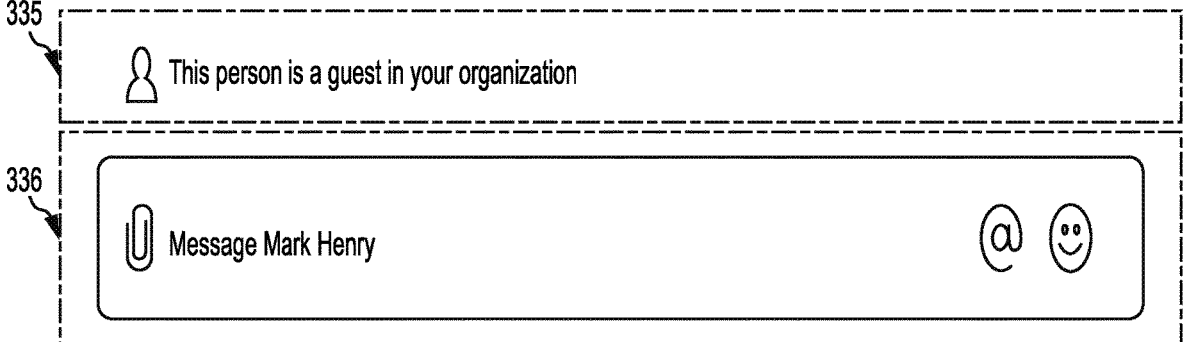
Figure 3U:
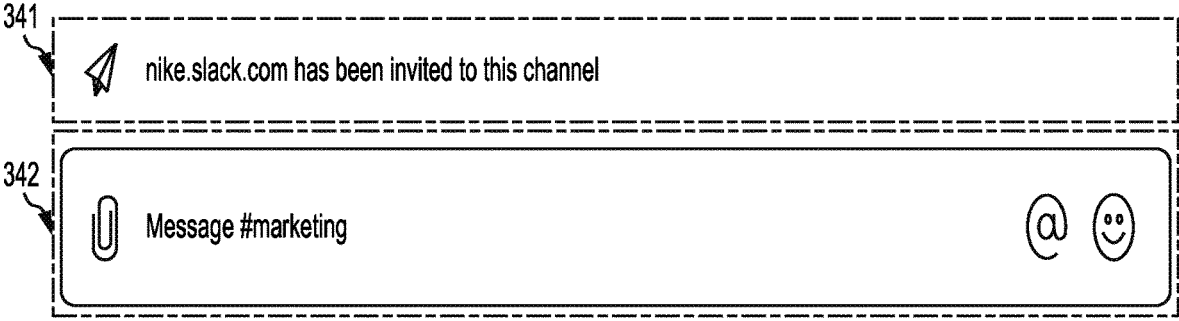

FIGS. 3A-3U illustrate example message composition interfaces and context panes configured in accordance with some examples of the present disclosure. In at least one example, a message composition interface can refer to one or more interface elements that are renderable to display an area by which a user may enter data to compose a message for the group-based communication system 105. A "context pane" can refer to a defined pane within a group-based communication interface that is configured for rendering context pane content as determined and described herein. In at least one example, context pane content can be data or other information presented via the context pane. The determination and presentation of context pane content is described below.

In FIG. 3A, an example group-based communication interface 300 comprises a message composition interface 302 along with a context pane 301. In some examples, the context pane 301 can be displayed upon detecting engagement by a client device with the message composition interface 302. In some examples, context pane content of the context pane 301 can be dynamically generated based in part on channel membership of a communication channel with which the message composition interface 302 is associated. In at least one example, the channel membership of the communication channel can be determined based at least in part on communication channel membership data, which can comprise user identifiers associated with a particular communication channel identifier.

In FIG. 3B, an example group-based communication interface comprises a message composition interface 304 along with a context pane 304. In some examples, the context pane 304 can be displayed upon detecting engagement by a client device with the message composition interface 303. In some examples, context pane content of the context pane 304 can be dynamically generated based in part on connectivity information.

In FIG. 3C, an example group-based communication interface comprises a message composition interface 306 along with a context pane 305. In some examples, the context pane 305 can be displayed upon detecting engagement by a client device with the message composition interface 306. In some examples, context pane content of the context pane 305 can be dynamically generated based in part on channel membership of a communication channel with which the message composition interface 306 is associated.

For example, context pane 305 may comprise renderable elements representative of time zone information associated with a user identifier with which the message composition interface 306 is associated.

In FIG. 3D, an example group-based communication interface comprises a message composition interface 308 along with a context pane 307. In some examples, the context pane 307 can be displayed upon detecting engagement by a client device with the message composition interface 308. In some examples, context pane content of the context pane 307 can be dynamically generated based in part on channel membership of a communication channel with which the message composition interface 308 is associated.

In FIG. 3E, an example group-based communication interface comprises a message composition interface 310 along with a context pane 309. In some examples, the context pane 309 can be displayed upon detecting engagement by a client device with the message composition interface 310. In some examples, context pane content of the context pane 309 can be dynamically generated based in part on channel membership of a communication channel with which the message composition interface 310 is associated. For example, context pane 309 may comprise renderable elements representative of custom status information associated with a user identifier with which the message composition interface 310 is associated.

In FIG. 3F, an example group-based communication interface comprises a message composition interface 312 along with a context pane 311. In some examples, the context pane 311 can be displayed upon detecting engagement by a client device with the message composition interface 312. In some examples, context pane content of the context pane 311 can be dynamically generated based in part on channel membership of a communication channel with which the message composition interface 312 is associated. For example, context pane 311 may comprise renderable elements representing that the communication channel is associated with more than one organization identifier (e.g., an organization identifier with which a sending user identifier associated with the client device is not directly associated; i.e., the channel is externally shared).

In FIG. 3G, an example group-based communication interface comprises a message composition interface 314 along with a context pane 313. In some examples, the context pane 313 can be displayed upon detecting engagement by a client device with the message composition interface 314. In some examples, context pane content of the context pane 313 can be dynamically generated based in part on channel membership of a communication channel with which the message composition interface 314 is associated. For example, context pane 313 may comprise renderable elements representing that the communication channel is associated with one or more guest user profiles.

In FIG. 3H, an example group-based communication interface comprises a message composition interface 316 along with a context pane 315. In some examples, the context pane 315 can be displayed upon detecting engagement by a client device with the message composition interface 316. In some examples, context pane content of the context pane 315 can dynamically generated based in part on channel membership of a communication channel with which the message composition interface 316 is associated. For example, context pane 315 may comprise renderable elements representing that the communication channel is associated with more than one organization identifier (e.g., an organization identifier with which a sending user identifier associated with the client device is not directly associated; i.e., the channel is externally shared).

In FIG. 3I, an example group-based communication interface comprises a message composition interface 318 along with a context pane 317. In some examples, the context pane 317 can be displayed upon detecting engagement by a client device with the message composition interface 318. In some examples, context pane content of the context pane 317 can be dynamically generated based in part on channel membership of a communication channel with which the message composition interface 318 is associated. For example, context pane 317 may comprise renderable elements representing that the communication channel is associated with more than one organization identifier (e.g., an organization identifier with which a sending user identifier associated with the client device is not directly associated; i.e., the channel is externally shared).

In FIGS. 3J-3K, an example group-based communication interface comprises a message composition interface 320 along with a context pane 319. In some examples, the context pane 319 can be displayed upon detecting engagement by a client device with the message composition interface 320. In some examples, context pane content of the context pane 319 can be dynamically generated based in part on channel membership of a communication channel with which the message composition interface 320 is associated. For example, context pane 319 may comprise renderable elements representing that the communication channel is associated with one or more guest user profiles.

In FIGS. 3L-3M, an example group-based communication interface comprises a message composition interface 324 along with a context pane 323. In some examples, the context pane 323 can be displayed upon detecting engagement by a client device with the message composition interface 324. In some examples, context pane content of the context pane 323 can be dynamically generated based in part on channel membership of a communication channel with which the message composition interface 324 is associated. For example, context pane 323 may comprise renderable elements representing that the communication channel is associated with more than one organization identifier (e.g., an organization identifier with which a sending user identifier associated with the client device is not directly associated; i.e., the channel is externally shared). Context pane 323 may further comprise renderable elements representing that the communication channel is associated with one or more guest user profiles.

In FIGS. 3N-3O, an example group-based communication interface comprises a message composition interface 328 along with a context pane 327. In some examples, the context pane 327 can be displayed upon detecting engagement by a client device with the message composition interface 328. In some examples, context pane content of the context pane 327 can be dynamically generated based in part on channel membership of a communication channel with which the message composition interface 328 is associated. For example, context pane 327 may comprise renderable elements representing that the communication channel is associated with more than one organization identifier (e.g., an organization identifier with which a sending user identifier associated with the client device is not directly associated; i.e., the channel is externally shared). In the some examples depicted in FIGS. 3N-3O, the communication channel is a multi-person direct message type channel.

In FIGS. 3P-3Q, an example group-based communication interface comprises a message composition interface 332 along with a context pane 331. In some examples, the context pane 331 can be displayed upon detecting engagement by a client device with the message composition interface 332. In some examples, context pane content of the context pane 331 can be dynamically generated based in part on channel membership of a communication channel with which the message composition interface 332 is associated. For example, context pane 331 may comprise renderable elements representing that the communication channel is associated with one or more guest user profiles. In the some examples depicted in FIGS. 3P-3Q, the communication channel is a multi-person direct message type channel.

In FIGS. 3R-3T, an example group-based communication interface comprises a message composition interface 336 along with a context pane 335. In some examples, the context pane 335 can be displayed upon detecting engagement by a client device with the message composition interface 336. In some examples, context pane content of the context pane 335 can be dynamically generated based in part on channel membership of a communication channel with which the message composition interface 336 is associated. For example, context pane 335 may comprise renderable elements representing that the communication channel is associated with more than one organization identifier (e.g., an organization identifier with which a sending user identifier associated with the client device is not directly associated; i.e., the channel is externally shared). Context pane 335 may further comprise renderable elements representing that the communication channel is associated with one or more guest user profiles. In the some examples depicted in FIGS. 3R-3T, the communication channel is a multi-person direct message type channel.

In FIG. 3U, an example group-based communication interface comprises a message composition interface 342 along with a context pane 341. In some examples, the context pane 341 can be displayed upon detecting engagement by a client device with the message composition interface 342. In some examples, context pane content of the context pane 341 can be dynamically generated based in part on channel membership of a communication channel with which the message composition interface 342 is associated. For example, context pane 341 may comprise renderable elements representing that the communication channel is associated with one or more pending invitations.

Figure 3V:
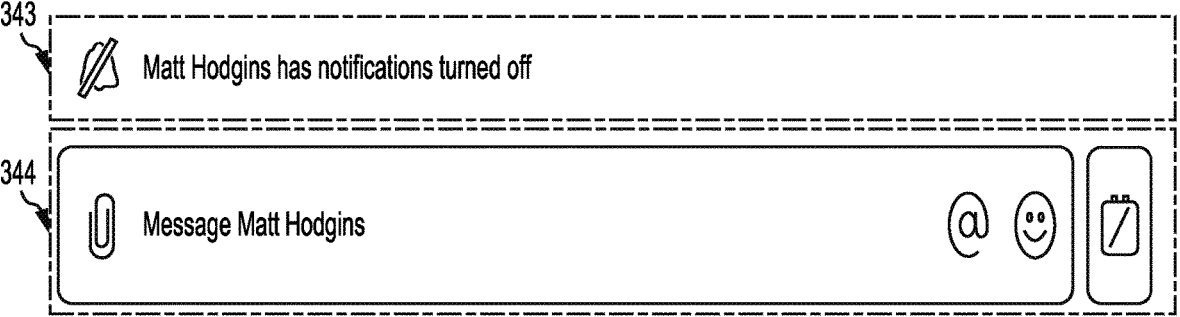

In FIG. 3V, an example group-based communication interface comprises a message composition interface 344 along with a context pane 343. In some examples, the context pane 343 can be displayed upon detecting engagement by a client device with the message composition interface 344. In some examples, context pane content of the context pane 343 can be dynamically generated based in part on channel membership of a communication channel with which the message composition interface 344 is associated. For example, context pane 343 may comprise renderable elements representing that a user profile associated with a user identifier to which the message is directed (e.g., when the communication channel is a direct message) has particular notification settings (e.g., "do-not-disturb" is enabled).

FIGS. 4A-4C illustrate example group-based communication interfaces configured in accordance with some examples of the present disclosure. In some examples, a group-based communication interface can comprise a message composition interface 401, shown in FIG. 4A. In some examples, the message composition interface 401 in FIG. 4A is rendered in a manner representative of an absence of engagement by a client device with the message composition interface 401. The message composition interface 401 in FIG. 4B is rendered in a manner representative of an absence of engagement by a client device with the message composition interface 401, however it can be seen in FIG. 4B that engagement is imminent by way of a circle overlaid on the interface (it will be appreciated that the circle is not an interface element and is merely indicative of engagement with the message composition interface). The message composition interface 401 illustrated in FIG. 4C has been altered in response to detected engagement as depicted in FIG. 4B, and a context pane 402 has been rendered in response to the detected engagement. In some examples, however, a same or similar context pane 402 can be presented without detecting engagement. That is, in some examples, the context pane 402 can be rendered whenever the message composition interface 401 is presented via the group-based communication interface.

Figures 5A, 5B:
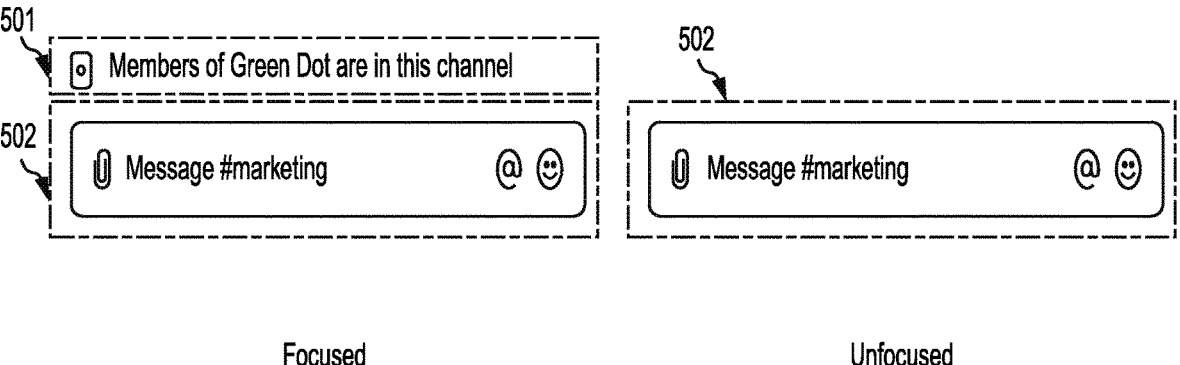
FIGS. 5A-5B illustrate example message composition interfaces and context panes configured in accordance with some examples of the present disclosure.

FIGS. 5A-5B illustrate example message composition interfaces and context panes configured in accordance with some examples of the present disclosure. In some examples, a context pane 501 may be rendered with a message composition interface 502 when the message composition interface 502 is "focused" or selected by a user via a client device. In some examples, the context pane 501 is not present with the message composition interface 502 and/or is unfocused or not selected. In some examples, however, a same or similar context pane 501 can be presented without detecting that the message composition interface 502 is "focused." That is, in some examples, the context pane 501 can be rendered whenever the message composition interface 502 is presented via the group-based communication interface.

Figures 6A, 6B:
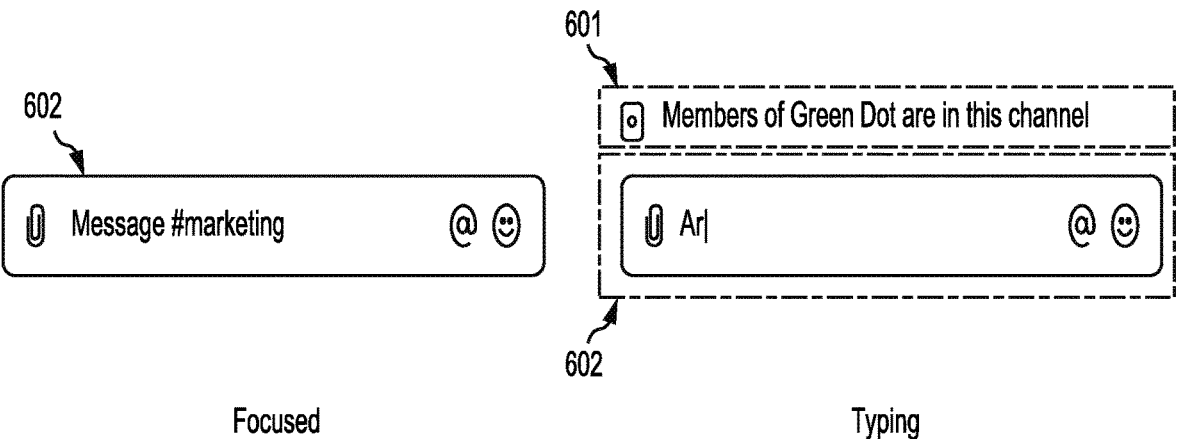
FIGS. 6A-6B illustrate example message composition interfaces and context panes configured in accordance with some examples of the present disclosure.

FIGS. 6A-6B illustrate example message composition interfaces and context panes configured in accordance with some examples of the present disclosure. In some examples, a context pane 601 may be rendered with a message composition interface 602 when engagement by a client device is detected. In some examples, the context pane 601 is not present when the message composition interface 602 is merely focused or selected. As described above, in some examples, however, a same or similar context pane 601 can be presented without detecting engagement. That is, in some examples, the context pane 601 can be rendered whenever the message composition interface 602 is presented via the group-based communication interface, without regard to whether engagement is detected and/or whether the message composition interface 602 is focused or selected.

Figures 7A, 7B:
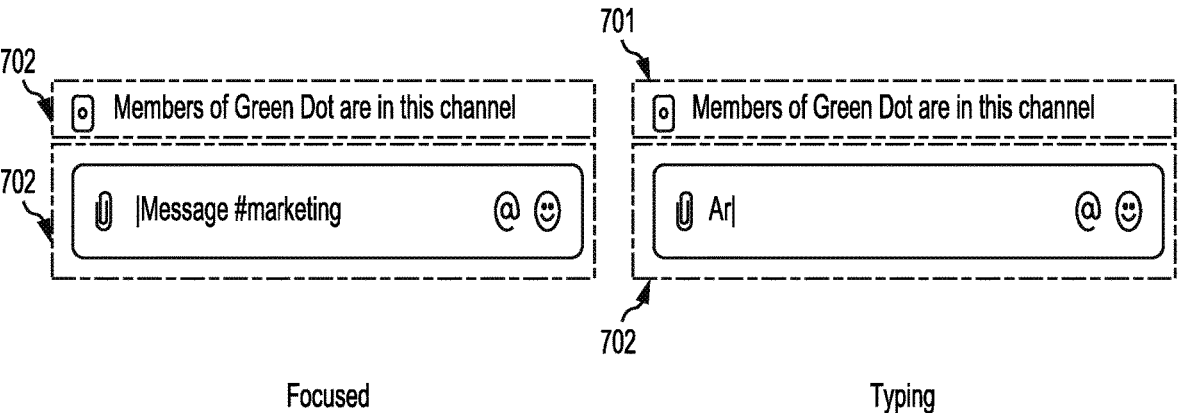
FIGS. 7A-7B illustrate example message composition interfaces and context panes configured in accordance with some examples of the present disclosure.

FIGS. 7A-7B illustrate example message composition interfaces and context panes configured in accordance with some examples of the present disclosure. In some examples, a context pane 701 may be rendered with a message composition interface 702, where the context pane 701 is rendered in a more pronounced manner when engagement by a client device is detected (i.e., the context pane is in bold type or regular type). In some examples, the context pane 701 is rendered in a less pronounced manner when the message composition interface 702 is merely focused or selected (i.e., the context pane is "dimmed" or rendered in lighter font or color).

Figure 8:
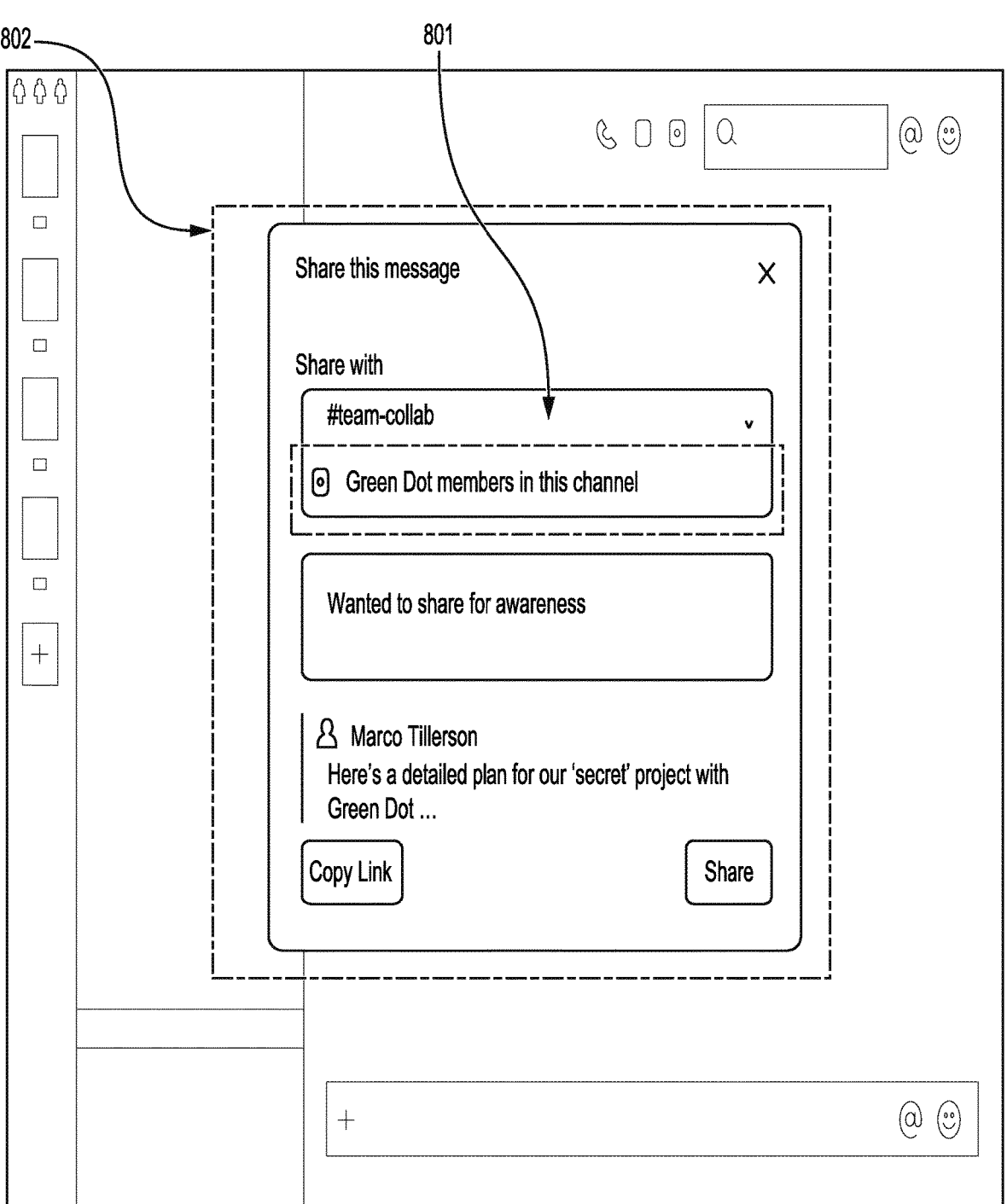
FIG. 8 illustrates an example message share interface configured in accordance with some examples of the present disclosure.

FIG. 8 illustrates an example message share interface 802 configured in accordance with some examples of the present disclosure. In at least one example, a message share interface 802 can comprise one or more interface elements that are renderable to display an area by which a user may enter data to share a message within the group-based communication system 105 with another user or channel of the group-based communication system 105. In some examples, a message share interface 802 can comprise a context pane

801 comprising context pane content representative of membership information related to a communication channel with which a message may be shared via the message share interface. In some examples, the message share interface may comprise a file share interface in a similar manner. In at least one example, the file share interface can refer to interface elements renderable to display an area by which a user may enter data to share a message within the group-based communication system 105 with another user or channel of the group-based communication system 105.

Figure 9A:
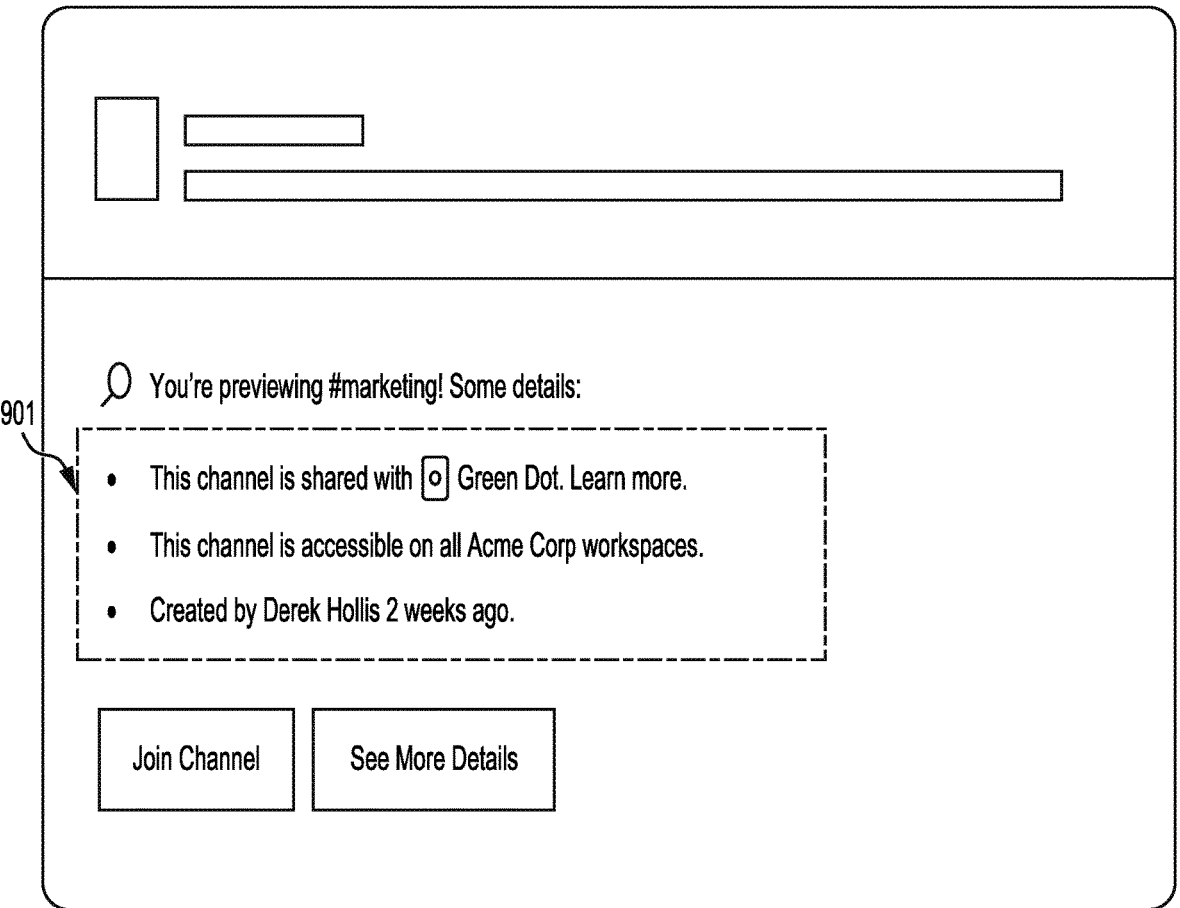
FIGS. 9A-9B illustrate example context panes for use with some examples of the present disclosure.
Figure 9B:
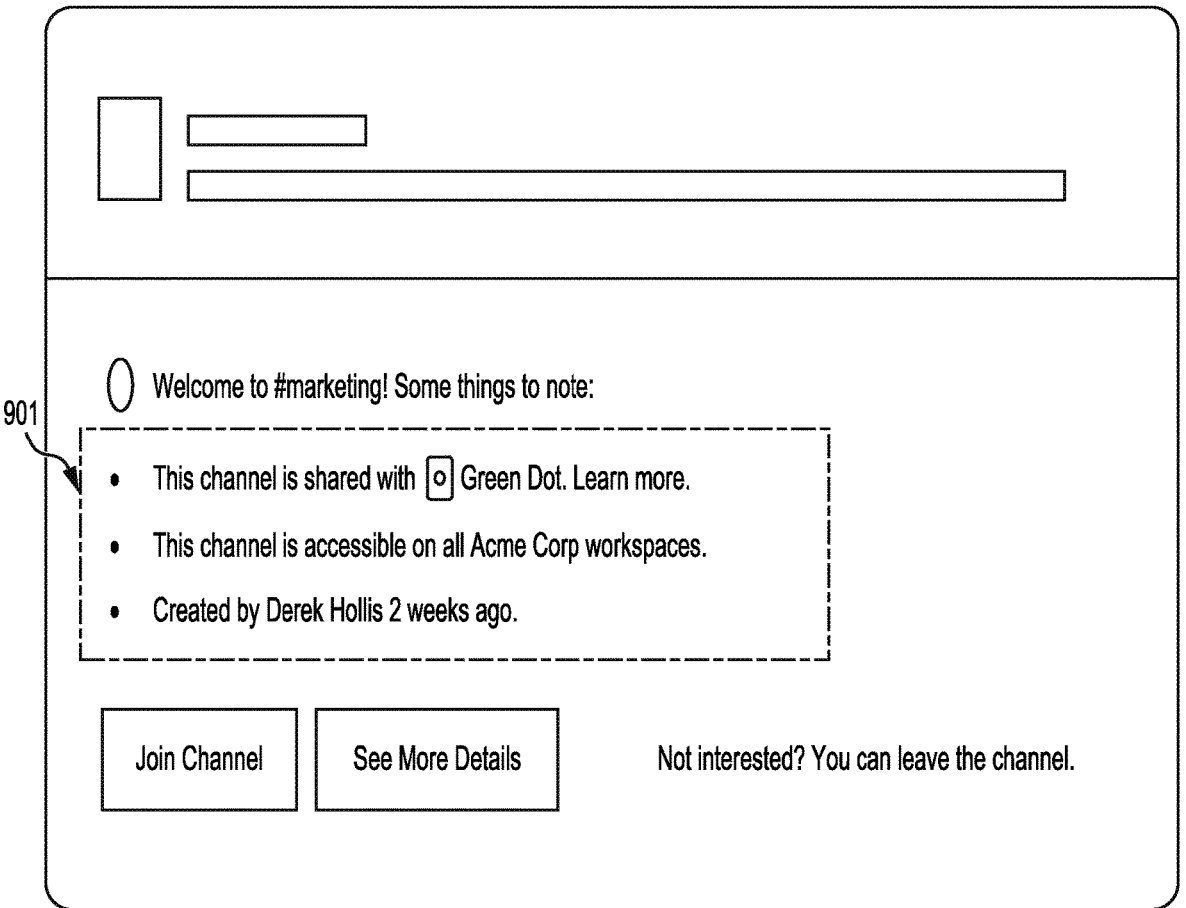

FIGS. 9A-9B illustrate example context panes for use with some examples of the present disclosure. In some examples, context panes 901 comprise contextual information related to particular channels.

Figure 10B:
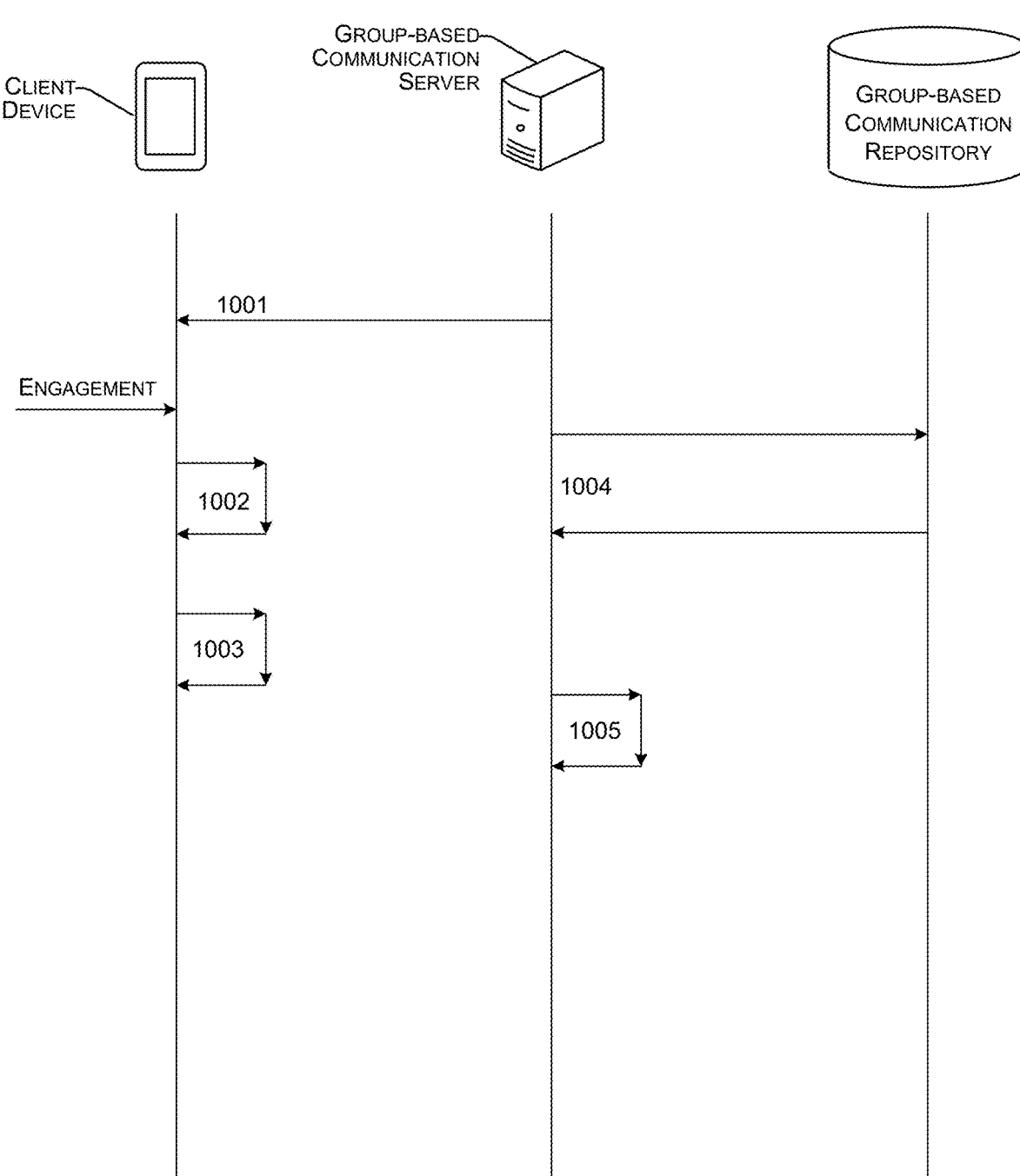
FIG. 10B is a signal diagram of an example data flow in accordance with some examples of the present disclosure.

FIGS. 10A-10B illustrate example operations involving techniques as described herein. The processes illustrated in FIGS. 10A-10B are described with reference to components described above with reference to the environment 100 shown in FIGS. 1 and 2 for convenience and ease of understanding. However, the processes illustrated in FIGS. 10A-10B are not limited to being performed using the techniques described above with reference to FIGS. 1 and 2. Moreover, the techniques described above with reference to FIGS. 1 and 2 are not limited to performing the processes illustrated in FIGS. 10A-10B.

The process in FIG. 10A is illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the process in FIG. 10A can be combined in whole or in part with each other or with other processes.

FIGS. 10A and 10B illustrate example operations 1000 for determining and rendering for display context pane content for use with some examples of the present disclosure.

At operation 1001, a message composition interface is transmitted to a client device for rendering within a group-based communication interface via a display device of the client device, the message composition interface associated with a group-based communication channel identifier. In some examples a message composition interface is transmitted to a client device for rendering within a group-based communication interface via a display device of the client device. In at least one example, the message composition interface can be associated with a communication channel identifier. As described above, in some examples, the message composition interface comprises a message share interface. In some examples, the message composition interface comprises a file share interface.

At operation 1002, context pane content can be determined for display within a context pane of the group-based communication interface. In some examples, the context pane content can be determined for display within a context pane of the group-based communication interface. In some examples, context pane content can be determined for display within a context pane of the group-based communication interface in response to detecting engagement of the message composition interface by the client device. In at least one example, the context pane content can be determined based in part on communication channel membership data associated with the communication channel identifier.

In at least one example, the context pane content determination circuitry 206 can receive an indication of the detected engagement of the message composition interface. In such an example, the context pane content determination circuitry 206 can utilize the communication channel identifier, to access communication channel data associated with the communication channel identifier. In some examples, the communication channel data can include communication channel membership data. In some examples, the communication channel data can include identifier(s) of organization(s) associated with the communication channel (e.g., indicating whether the communication channel is shared externally (or not)), indications of guest(s) associated with the communication channel, and/or the like. In some examples, the context pane content determination circuitry 206 can determine the context pane content for display within the context pane based at least in part on the communication channel data.

In at least one example, the context pane content determination circuitry 206 can determine additional or alternative context associated with a message. For instance, the context pane content determination circuitry 206 can access user profile(s) associated with member(s) of the communication channel, time zone information associated with the user profile(s), custom status information associated with the user profile(s), and/or the like. In some examples, data associated with the user profile(s) can be analyzed to determine one or more suggested topics to include in the context pane content. In at least one example, the context pane content determination circuitry 206 can determine one or more suggested user identifiers for mentioning in the message composition interface, one or more pending invites associated with the communication channel, and/or the like.

At operation 1003, the context pane can be rendered within the group-based communication interface. In some examples, the group-based communication circuitry 204 can cause the context pane to be rendered within a user interface, such as the group-based communication interface on a client device.

In some examples, the communication channel identifier is associated with a communication channel that is associated with two or more organization identifiers. In some examples, the context pane content comprises one or more renderable elements representing that the communication channel is associated with two or more organization identifiers. In some examples, the communication channel identifier is associated with one or more guest user profiles. In some examples, the context pane content comprises one or more renderable elements representing that the communication channel is associated with one or more guest user profiles.

In some examples, the context pane content comprises renderable elements representative of one or more of time zone information associated with one or more user profiles associated with the communication channel identifier, custom status information associated with one or more user profiles associated with the communication channel identifier, one or more suggested topics, one or more suggested user identifiers for mentioning in the message composition interface, or one or more pending invites associated with the communication channel identifier.

In some examples, the rendering of the context pane can be caused in response to detecting non-keystroke engagement of the message composition interface by the client device. In at least one example, "non-keystroke engagement" can refer to user interaction, via a graphical user interface, with a channel title interface component in which such user interaction is free from (i.e., excludes) the entering of one or more (e.g., keystroke) characters into a channel title interface component. For example, touch-screen or mouse click engagement with a channel title interface component is one example of non-keystroke engagement. "Keystroke engagement," on the other hand, refers to entering of one or more keystrokes into a channel title interface component of a graphical user interface. For example, input of one or more characters (e.g., alphanumeric characters) into a channel title interface component is one example of keystroke engagement.

In some examples, the context pane content can be programmatically determined based on relationships among group-based communication objects of a group-based communication data corpus. As described above, group-based communication object can comprise electronic data objects or digital content objects specifically executable and/or otherwise accessible via the group-based communication system 105 and/or at least one external resource of the external resources 103A-103N. Group-based communication objects may be received at the group-based communication system 105 by receiving those group-based communication objects conveyed to (pushed to) the group-based communication system 105, or the group-based communication system 105 may retrieve (pull to) various group-based communication objects stored within accessible storage areas of the one or more client devices 101A-101N, external resources 103A-103N, and/or the like. The group-based communication objects can include body content data and metadata. The body content data of the group-based communication objects may be interpreted by the group-based communication apparatus 200 to display or otherwise convey human-readable representations of information and/or computer-executable content that causes a particular client device to operate in a particular way. Specifics of certain group-based communication objects examples can be discussed herein, however, it should be understood that in some examples, group-based communication objects may be embodied as messaging communications, emails, events, audio files, video files, document files, spreadsheet files, presentation files, tasks, and/or the like; as well as any contextual data corresponding therewith. Group-based communication objects may thus be non-personal (alternatively referred to as public) as they can be exchanged between a plurality of users or otherwise made available to a plurality of users. Alternatively, group-based communication objects may be personal in nature (e.g., as defined by a portion of metadata associated with the group-based communication object), such that access to the content of the group-based communication object is limited to a single user (or a limited number of defined users). For example, group-based communication objects personal to a single user may encompass tasks or task lists defined personally by and for a particular user. Access to personal group-based communication objects may be limited to access requests associated with defined user identifiers. In some examples, personal group-based communication objects may be represented as encrypted data when indexed in database storage areas and/or when included within work graph data structures including personal and non-personal group-based communication objects.

In at least one example, a group-based communication system data corpus and/or a group-based communication data corpus refer to a collection of data that has been received by a group-based communication system 107 through group-based communication interfaces. In some examples, a group-based communication system data corpus may comprise one or more of a group-based communication data work objects, group-based communication messages, communication channels, or user profiles associated with the group-based communication system 105.

At operation 1004, group-based communication objects can be retrieved from a group-based communication repository. In some examples, a work graph structure can be generated based on the relationships among the group-based communication objects of a group-based communication data corpus (e.g., such objects can be retrieved from a group-based communication repository 107). Additional details associated with generating a work graph structure and/or training a machine learning models based thereon, are described below.

At operation 1005, context pane content can be programmatically determined based on learned relationships among group-based communication objects. In some examples, the relationships can be programmatically determined based on one or more trained machine learning models.

In some examples, context pane content available for selection for display within the context pane of the group-based communication interface can be transmitted to the client device with one of the message composition interface or the group-based communication interface.

In some examples, the communication channel can be a shared communication channel and the context pane content comprises renderable elements representing that the communication channel is a shared communication channel.

Generating a Work Graph of Group-Based Communication Objects

Group-based communication objects may be stored in one or more database storage areas of the group-based communication repository 107 during applicable data indexing procedures. Moreover, such group-based communication objects may be stored as entries of a graphical database (or a relational database providing similar functionality for illustrating relationships between group-based communication objects, or any of a variety of other database storage structures for providing similar data storage configurations), providing data illustrative of generated relationships between various group-based communication objects. Those relationships between group-based communication objects may be generated based at least in part on metadata and body content data generated and appended to various group-based communication objects, and channel title data.

The relationships between group-based communication objects define a work graph illustrating relationships among a plurality of group-based communication objects, which may be usable by one or more artificial intelligence-based search systems for identifying a plurality of inter-related group-based communication objects to be presented in response to a particular search query or command. In some examples, group-based communication objects stored within a work graph can be each characterized by their own access credentials/requirements. Accordingly, some group-based communication objects within the work graph may only be accessible to a select group of users (e.g., a single user), whereas other group-based communication objects within the same work graph may be accessible to a larger/different group of users (e.g., all users associated with a particular group-based communication workspace). Despite these differences in accessibility between various group-based communication objects within a common work graph, relationships established between various group-based communication objects may be usable to establish topics for various group-based communication objects, for establishing a particular user's expertise, to determine relatedness of group-based communication objects for search queries, and/or the like.

For each group-based communication object, the group-based communication repository 107, the group-based communication apparatus 200, or other components of the group-based communication system 105 may perform an analysis of the body contents and/or metadata and/or supplemental metadata generated by the group-based communication system 105 to determine other group-based communication objects deemed sufficiently relevant to illustrate a connection within the work graph.

In various some examples, the group-based communication apparatus is configured to determine each group-based communication object's relationship to other group-based communication objects based on the metadata, and other data. The group-based communication apparatus is thus configured to assemble the group-based communication data corpus into a work graph data structure.

In some examples, the group-based communication apparatus may identify shared topics within metadata of one group-based communication object relative to other group-based communication objects; identify common sending user identifiers; identify common event participants (a greater number or percentage of shared participants may provide a stronger indicated relationship); identify common group-based communication object types; identify common intended recipients; identify temporal relationships between generation/transmission of group-based communication objects; and/or the like.

The group-based communication apparatus may establish weighted relationship scores between each of the group-based communication objects of the group-based communication object corpus. For example, stronger relationships (e.g., a higher number of shared characteristics), or certain types of relationships (e.g., as identified via a machine learning algorithm) may result in a higher relationship score between the analyzed group-based communication object and one or more other group-based communication objects. These relationship scores may be ranked (e.g., by direct comparison of relationship scores, by normalization of comparison scores on a shared scale (e.g., 0-1), and/or the like). In some examples, those relationship scores satisfying a first degree score criteria (e.g., exceeding a score threshold) may be utilized to establish direct relationships between the analyzed group-based communication object and those other group-based communication objects having a sufficient relationship score. Those first degree scores may then be mapped within the work graph data structure (e.g., by establishing edges between data indicative of group-based communication objects within a graphical database, by providing data indicative of related group-based communication objects within data of a particular group-based communication object database entry within a relational database, and/or the like). The process may then be repeated for each user identifier of a given group-based communication workspace or set of group-based communication workspaces.

It should be understood that, in accordance with some examples, relationships between various group-based communication objects may be symmetrical (e.g., the degree of relatedness of a first object to a second object is identical to the degree of relatedness of the second object to the first object). However, it should be understood that in some examples, the relationships between various group-based communication objects may be asymmetrical (e.g., the degree of relatedness of a first object to a second object is not identical to the degree of relatedness of the second object to the first object).

Although work graph data structures assembled as described herein may illustrate relationships between various group-based communication objects, the work graph data structures may also be utilized to determine relationships between users, between users and communication channels, between users and topics, between communication channels and topics, between communication channels, between topics, between users and group-based communication objects, between communication channels and group-based communication objects, between topics and group-based communication objects, and/or the like. Thus, the work graph data structure may be configured to establish relationships between group-based communication objects, and those relationships may be further utilized to identify relationships between other aspects of data utilized with the group-based communication apparatus (such as data indicative of particular users, channels, workspaces, and/or the like).

The group-based communication system 105 (e.g., via the group-based communication repository 107 and/or the like) utilizes the work graph data structure to generate a machine learning structure (e.g., a neural network) that may be utilized for executing search queries for users. For example, the group-based communication system may implement an unsupervised learning structure, a supervised learning structure, a reinforcement learning structure, a deep learning structure, and/or the like for utilizing relationships established via the work graph data structure to generate search results for various group-based communication objects.

In some examples, a global machine learning algorithm may be utilized for all group-based communication objects stored at or accessible via the group-based communication platform system. In such some examples, access to particular group-based communication objects (e.g., via a search query utilizing the machine-learning algorithm) may be limited based at least in part on access privileges of the searching user (e.g., a user may only be able to access group-based communication objects associated with permitted communication channels). In some examples, machine learning algorithms may be established independently for each of a plurality of groups, such that training of the machine learning algorithm is based on group-based communication objects exchanged within the particular group alone.

The machine learning algorithms may be generated and/or updated periodically, to reflect changes within the work graph data structure that result from the addition and/or aging of group-based communication objects within the work graph data structure. Moreover, the machine learning parameters (including those parameters indicative of the underlying neural network of the machine learning algorithm) may be stored within the group-based communication repository.

CONCLUSION

Many modifications and some examples will come to mind to one skilled in the art to which this disclosure pertains having the benefit of the teachings presented in the foregoing descriptions and the associated drawings. Therefore, it is to be understood that the disclosure is not to be limited to the specific some examples disclosed and that modifications and some examples can be intended to be included within the scope of the appended claims. Although specific terms can be employed herein, they can be used in a generic and descriptive sense only and not for purposes of limitation.

That which is claimed:

1. A method comprising:

causing rendering of a message composition interface within a group-based communication interface presented via a client associated with a group-based communication system, wherein the message composition interface is associated with a communication channel identifier corresponding to a communication channel, wherein the client is associated with a user, and wherein the message composition interface is a user interface element renderable to receive user input comprising message body contents;

determining communication channel membership data associated with the communication channel identifier;

determining one or more members of a plurality of members of the communication channel to display to the user as a first suggestion associated with a message and one or more topics to display to the user as a second suggestion associated with the message, wherein the one or more members and the one or more topics are based at least in part on a plurality of historical messages, the communication channel identifier, the communication channel membership data, and expertise of the one or more members in the one or more topics, wherein the expertise is associated with a frequency of mention of the one or more topics in the plurality of historical messages or key words associated with the one or more topics in the plurality of historical messages;

responsive to determining the one or more members and the one or more topics, generating context pane content associated with one or more context panes, wherein the context pane content comprises at least one of the one or more members and at least one of the one or more topics;

causing rendering of the message composition interface and the one or more context panes;

causing rendering of the context pane content within the one or more context panes without receiving a user request for the context pane content; and receiving an indication of selection by the user of at least one member of the one or more members and at least one topic of the one or more topics for inclusion in the message composition interface; and generating a work graph data structure to illustrate weighted relationship scores between the message body contents and context pane content.

2. The method of claim 1, wherein determining the one or more members and the one or more topics comprises determining at least one of the one or more members or at least one of the one or more topics using a machine learning model.

3. The method of claim 1, wherein determining the one or more topics comprises determining the one or more topics via a data model trained using a topic modeling machine learning mechanism.

4. The method of claim 1, wherein the communication channel is shared with an external organization other than an organization of the user and wherein the context pane content is further based at least in part on user data associated with one or more external users associated with the external organization.

5. The method of claim 1, wherein the context pane content further comprises at least one of:

a date;

a time zone;

a priority level of the message associated with the message composition interface; or one or more privileges associated with the message.

6. The method of claim 1, wherein the client comprises a first client, the method further comprising:

causing rendering of the message associated with the message composition interface via one or more second clients.

7. The method of claim 1, wherein the client comprises a first client, and wherein the message composition interface is associated with an exchange of messages between the first client and one or more second clients.

8. The method of claim 2, wherein the machine learning model is trained using at least one of the communication channel identifier, the communication channel membership data, or one or more historical messages of the plurality of historical messages.

9. A system comprising:

one or more processors; and one or more non-transitory computer-readable media storing instructions executable by the one or more processors, wherein the instructions cause the one or more processors to perform acts comprising:

causing rendering of a message composition interface within a group-based communication interface presented via a client associated with a group-based communication system, wherein the message composition interface is associated with a communication channel identifier corresponding to a communication channel, wherein the client is associated with a user, and wherein the message composition interface is a user interface element renderable to receive user input comprising message body contents;

determining communication channel membership data associated with the communication channel identifier;

determining one or more members of a plurality of members of the communication channel to display to the user as a first suggestion associated with a message and one or more topics to display to the user as a second suggestion associated with the message, wherein the one or more members and the one or more topics are based at least in part on a plurality of historical messages, the communication channel identifier, the communication channel membership data, and expertise of the one or more members in the one or more topics, wherein the expertise is associated with a frequency of mention of the one or more topics in the plurality of historical messages or key words associated with the one or more topics in the plurality of historical messages;

responsive to determining the one or more members and the one or more topics, generating context pane content associated with a context pane, wherein the context pane content comprises at least one of the one or more members and at least one of the one or more topics;

causing rendering of the message composition interface and the context pane;

causing rendering of the context pane content within the context pane without receiving a user request for the context pane content; and receiving an indication of selection by the user of at least one member of the one or more members and at least one topic of the one or more topics for inclusion in the message composition interface; and generating a work graph data structure to illustrate weighted relationships scores between the message body contents and context pane content.

10. The system of claim 9, wherein determining the one or more members and the one or more topics comprises determining at least one of the one or more members or at least one of the one or more topics using a machine learning model.

11. The system of claim 9, wherein determining the one or more topics comprises determining the one or more topics via a data model trained using a topic modeling machine learning mechanism.

12. The system of claim 9, wherein the communication channel is shared with an external organization other than an organization of the user and wherein the context pane content is further based at least in part on user data associated with one or more external users associated with the external organization.

13. The system of claim 9, wherein the context pane content further comprises a priority level of the message associated with the message composition interface.

14. The system of claim 9, wherein the context pane content further comprises one or more privileges associated with the message.

15. The system of claim 9, wherein the communication channel is associated with a plurality of organization identifiers, and wherein the context pane content further comprises one or more renderable elements indicating the communication channel is associated with the plurality of organization identifiers.

16. The system of claim 9, wherein the communication channel is associated with one or more guest user profiles, and wherein the context pane content further comprises one or more renderable elements indicating the communication channel is associated with the one or more guest user profiles.

17. The system of claim 9, wherein, based on receiving the indication of the selection, sending the message to the at least one member.

18. One or more non-transitory computer-readable media storing instructions executable by one or more processors that, when executed by the one or more processors, cause the one or more processors to perform acts comprising:

causing rendering of a message composition interface within a group-based communication interface presented via a client associated with a group-based communication system, wherein the message composition interface is associated with a communication channel identifier corresponding to a communication channel, wherein the client is associated with a user, and wherein the message composition interface is a user interface element renderable to receive user input comprising message body contents;

determining communication channel membership data associated with the communication channel identifier;

determining one or more members of a plurality of members of the communication channel to display to the user as a first suggestion associated with a message and one or more topics to display to the user as a second suggestion associated with the message, wherein the one or more members and the one or more topics are based at least in part on a plurality of historical messages, the communication channel identifier, the communication channel membership data, and expertise of the one or more members in the one or more topics, wherein the expertise is associated with a frequency of mention of the one or more topics in the plurality of historical messages or key words associated with the one or more topics in the plurality of historical messages;

responsive to determining the one or more members and the one or more topics, generating context pane content associated with one or more context panes, wherein the context pane content comprises at least one of the one or more members and at least one of the one or more topics;

causing rendering of the message composition interface and the one or more context panes;

causing rendering of the context pane content within the one or more context panes without receiving a user request for the context pane content; and receiving an indication of selection by the user of at least one member of the one or more members and at least one topic of the one or more topics for inclusion in the message composition interface; and generating a work graph data structure to illustrate weighted relationships scores between the message body contents and context pane content.

19. The one or more non-transitory computer-readable media of claim 18, wherein determining the one or more topics comprises determining the one or more topics via a data model trained using a topic modeling machine learning mechanism.

20. The one or more non-transitory computer-readable media of claim 18, wherein the context pane content further comprises at least one of:

a date;

a time zone;

a priority level of the message associated with the message composition interface; or one or more privileges associated with the message.

* * * * *